United States Patent
Frosch et al.

(10) Patent No.: US 12,530,614 B2
(45) Date of Patent: Jan. 20, 2026

(54) AUTOMATED MACHINE LEARNING MODEL FEEDBACK WITH DATA CAPTURE AND SYNTHETIC DATA GENERATION

(71) Applicant: GE Precision Healthcare LLC, Milwaukee, WI (US)

(72) Inventors: Travis R. Frosch, Orlando, FL (US); Anastasia Marie Van Dyke Dunn, Vashon Island, WA (US); Garry M. Whitley, Clinton, TN (US); Alvaro Molina, Madrid (ES); Weston R Olmstead, Greeneville, TN (US)

(73) Assignee: GE Precision Healthcare LLC, Waukesha, WI (US)

( * ) Notice: Subject to any disclaimer, the term of this patent is extended or adjusted under 35 U.S.C. 154(b) by 922 days.

(21) Appl. No.: 17/235,026

(22) Filed: Apr. 20, 2021

(65) Prior Publication Data

US 2022/0335328 A1  Oct. 20, 2022

(51) Int. Cl.
*G06N 20/00* (2019.01)
*G06N 5/04* (2023.01)
(Continued)

(52) U.S. Cl.
CPC ............... *G06N 20/00* (2019.01); *G06N 5/04* (2013.01); *G16H 30/20* (2018.01); *G16H 50/20* (2018.01)

(58) Field of Classification Search
CPC .......... G06N 20/00; G06N 5/04; G16H 30/20; G16H 50/20
(Continued)

(56) References Cited

U.S. PATENT DOCUMENTS

2018/0307942 A1* 10/2018 Pereira ..................... G06F 18/24
2019/0043611 A1* 2/2019 Saalbach ................ G16H 30/20
(Continued)

OTHER PUBLICATIONS

"Health Level 7 (HL7)." Extrahop, Aug. 11, 2020, www.extrahop.com/resources/protocols/hl7/. Accessed Mar. 20, 2024. (Year: 2020).*
(Continued)

*Primary Examiner* — Stephen S Hong
*Assistant Examiner* — Broderick C Anderson
(74) *Attorney, Agent, or Firm* — Amin, Turocy & Watson, LLP

(57) ABSTRACT

Systems and techniques that facilitate automated machine learning model feedback with data capture and synthetic data generation are provided. In various embodiments, a receiver component can receive electronic input identifying a deployed machine learning model. In various aspects, a listener component can retrieve from a data pipeline a data candidate that has been analyzed by the deployed machine learning model, an inference generated by the deployed machine learning model based on the data candidate, and an expert conclusion provided by a subject matter expert based on the data candidate. In various instances, a comparison component can compare the inference with the expert conclusion to determine whether the inference is consistent with the expert conclusion. In various cases, an augmentation component can, in response to a determination that the inference is not consistent with the expert conclusion, generate a set of synthetic training data based on the data candidate.

21 Claims, 10 Drawing Sheets

(51) Int. Cl.
*G16H 30/20* (2018.01)
*G16H 50/20* (2018.01)

(58) Field of Classification Search
USPC .......................................................... 706/12
See application file for complete search history.

(56) References Cited

U.S. PATENT DOCUMENTS

| | | | |
|---|---|---|---|
| 2019/0138431 A1* | 5/2019 | Holbrook | G06F 8/65 |
| 2019/0286850 A1* | 9/2019 | Popescu | G16H 50/20 |
| 2019/0294923 A1* | 9/2019 | Riley | G06F 18/24 |
| 2019/0318202 A1* | 10/2019 | Zhao | G06F 18/214 |
| 2020/0312457 A1* | 10/2020 | Kasthurirathne | G16H 10/60 |
| 2020/0320345 A1* | 10/2020 | Nikolenko | G06N 3/08 |
| 2020/0342362 A1* | 10/2020 | Soni | G16H 10/00 |
| 2022/0122001 A1* | 4/2022 | Choe | G06N 20/20 |

OTHER PUBLICATIONS

Goncalves, Andre, et al. "Generation and Evaluation of Synthetic Patient Data." BMC Medical Research Methodology, vol. 20, No. 1, May 7, 2020, https://doi.org/10.1186/s12874-020-00977-1. (Year: 2020).*

* cited by examiner

AUTOMATED MACHINE LEARNING MODEL FEEDBACK WITH DATA CAPTURE AND SYNTHETIC DATA GENERATION

TECHNICAL FIELD

The subject disclosure relates generally to machine learning model monitoring, and more specifically to techniques for facilitating automated machine learning model feedback with data capture and synthetic data generation.

BACKGROUND

Once trained and validated, a machine learning model can be deployed in any suitable technical field. The prediction accuracy which the machine learning model exhibits during deployment can differ from the prediction accuracy exhibited by the machine learning model during validation and/or training. This performance disparity can be due to differences between the input data encountered by the machine learning model during deployment and the input data encountered by the machine learning model during training and/or validation. To promote optimal operation, it can be desired to monitor the performance exhibited by the machine learning model when deployed. Conventionally, a deployed machine learning model is manually monitored by developers and/or operators associated with the machine learning model. Such manual monitoring is often resource-intensive and insufficiently rigorous.

Accordingly, systems and/or techniques that can address this technical problem can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate automated machine learning model feedback with data capture and synthetic data generation are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various aspects, the receiver component can receive electronic input identifying a deployed machine learning model. In various embodiments, the computer-executable components can further comprise a listener component. In various instances, the listener component can retrieve from a data pipeline a data candidate that has been analyzed by the deployed machine learning model. In various cases, the listener component can further retrieve from the data pipeline an inference generated by the deployed machine learning model based on the data candidate. In various aspects, the listener component can further retrieve from the data pipeline an expert conclusion provided by a subject matter expert based on the data candidate. In various embodiments, the computer-executable components can further comprise a comparison component. In various instances, the comparison component can compare the inference with the expert conclusion to determine whether the inference is consistent with the expert conclusion. In various embodiments, the computer-executable components can further comprise an augmentation component. In various cases, the augmentation component can, in response to a determination that the inference is not consistent with the expert conclusion, generate a set of synthetic training data based on the data candidate. In various embodiments, the computer-executable components can further comprise a training component, which can train the deployed machine learning model based on the set of synthetic training data.

According to one or more embodiments, the above-described system can be implemented as a computer-implemented method and/or a computer program product.

DETAILED DESCRIPTION

Figure 1:
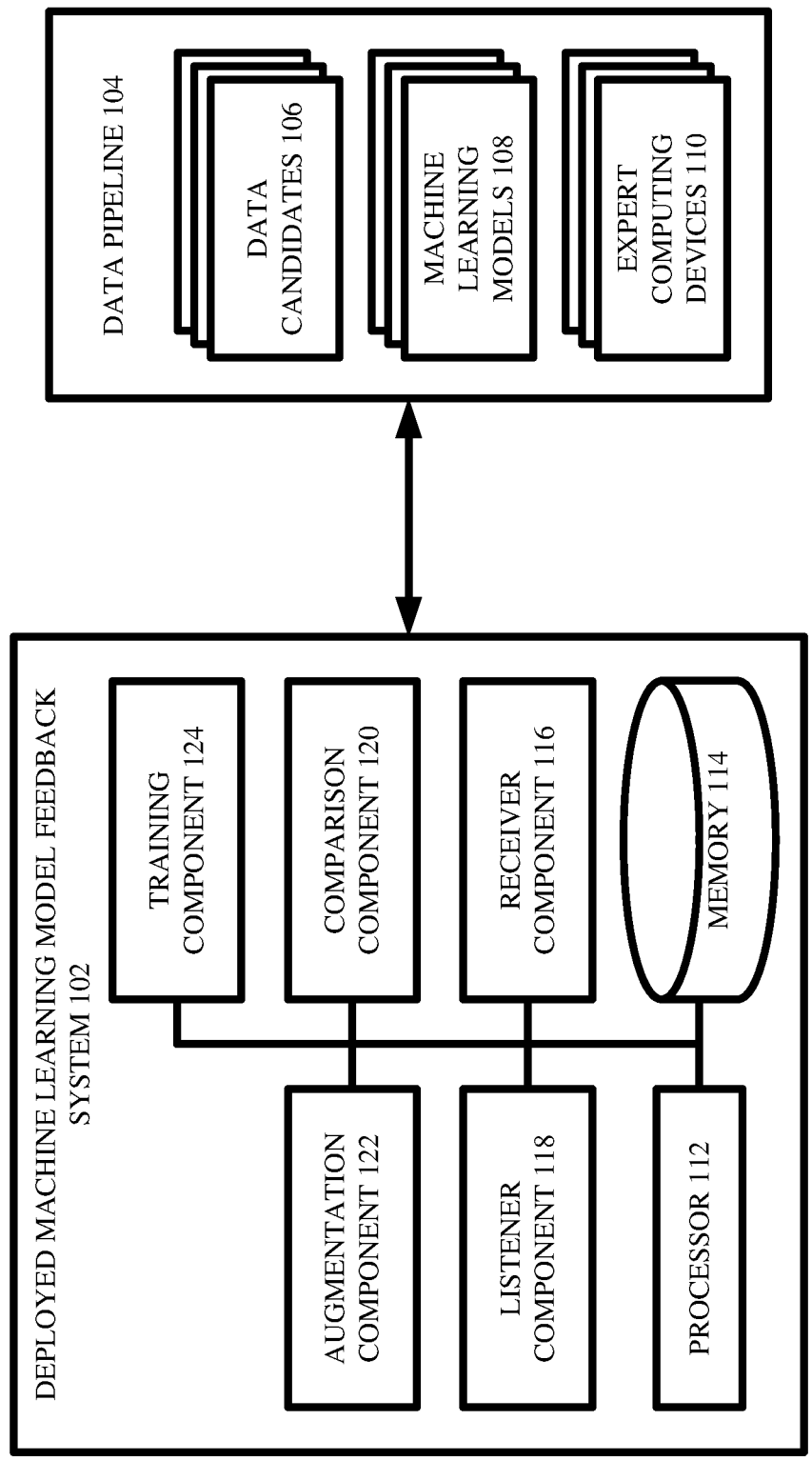
FIG. 1 illustrates a block diagram of an example, non-limiting system that facilitates automated machine learning model feedback with data capture and synthetic data generation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, once a machine learning model (e.g., neural network, support vector machine, logistic regression model, naïve Bayes model) is trained and validated, the machine learning model can be deployed in any suitable technical field. For example, a machine learning model can be deployed in the biomedical field. For instance, the machine learning model can be configured to receive as input biomedical data (e.g., DICOM data of a particular patient, biomedical scanned images of a particular patient, medical history of a particular patient) and to produce as output biomedical determinations (e.g., diagnoses for the particular patient, prognoses for the particular patient, recommended treatments for the particular patient). As another example, a machine learning model can be deployed in the climate science field. For instance, the machine learning model can be configured to receive as input past weather data (e.g., past climate temperature data, past climate pressure data, past climate precipitation data) and to produce as output future weather determinations (e.g., forecasted climate temperature, forecasted climate pressure, forecasted climate precipitation). As yet another example, a machine learning model can be deployed in the commercial transactions field. For instance, the machine learning model can be configured to receive as input customer data (e.g., demographics of a particular customer, transaction history of a particular customer, product/service preferences of a particular customer) and to produce as output customer determinations (e.g., a probability of transacting associated with the particular customer, a probability of transaction failure associated with the particular customer).

The accuracy of the determinations produced by the machine learning model when deployed in the field can differ from that exhibited by the machine learning model during training and/or validation. In various cases, this performance disparity can be due to differences between the input data encountered by the machine learning model during deployment and the input data encountered by the machine learning model during training and/or validation. For example, a machine learning model can be configured to receive as input an MRI scanned image associated with a patient and to produce as output a diagnosis based on the MRI scanned image. In various cases, the machine learning model can be trained and/or validated on datasets that comprise MRI scanned images associated with patients having certain demographics (e.g., patients within a certain age range, patients of certain ethnicities, patients without comorbidities). In various aspects, once deployed in the field, the machine leaning model can encounter MRI scanned images associated with patients that fall outside of these certain demographics (e.g., patients outside of the certain age range, patients not belonging to the certain ethnicities, patients with comorbidities). Because the machine learning model did not encounter such MRI scanned images during training and/or validation, the machine learning model can exhibit reduced diagnosis accuracy when encountering such MRI scanned images during deployment. Such differences in input data can exist because it can be impracticable to represent within a training dataset and/or a validation dataset the full range of all possible input data variations which can be encountered in the field.

To promote optimal operation, it can be desired to monitor the performance exhibited by the machine learning model when deployed so that such performance disparities can be detected and/or rectified. Conventionally, a deployed machine learning model is manually monitored by developers and/or operators associated with the machine learning model. For instance, one or more subject matter experts can operate the machine learning model in the field, and the one or more subject matter experts can be surveyed regarding how often they believe the machine learning model is producing inaccurate determinations in the field.

The inventors of various embodiments of the subject innovation recognized various problems with such manual monitoring. For instance, the inventors of various embodiments of the subject innovation recognized that such manual monitoring is often resource-intensive (e.g., time consuming). Moreover, the inventors of various embodiments of the subject innovation recognized that such manual monitoring is insufficiently rigorous and/or insufficiently granular. In other words, the inventors realized that such manual monitoring results only in the calculation of statistical metrics (e.g., percent of true positives, percent of false positives, percent of true negatives, percent of false negatives) that define the aggregate performance exhibited by the machine learning model when deployed, without any in-depth analysis with respect to individual input data candidates encountered by the machine learning model. More specifically, the inventors realized that such manual monitoring fails to leverage the specific input data candidates that cause the machine learning model to generate inaccurate results when deployed in the field.

Various embodiments of the subject innovation can address one or more of these technical problems. One or more embodiments described herein include systems, computer-implemented methods, apparatus, and/or computer program products that can facilitate automated machine learning model feedback with data capture and synthetic data generation. As mentioned above, the inventors of various embodiments of the subject innovation recognized that conventional techniques for monitoring a deployed machine learning model are manual procedures that fail to leverage specific input data candidates that cause the deployed machine learning model to produce incorrect results. Accordingly, the inventors devised various embodiments of the subject innovation so as to automatically capture input data candidates which cause a deployed machine learning model to generate inaccurate determinations. This can be beneficial because failure data (e.g., input data candidates which cause a deployed machine learning model to produce incorrect inferences) can be valuable from a development and/or training perspective. Specifically, such failure data can be leveraged so as to improve the performance of the deployed machine learning model.

In various instances, embodiments of the subject innovation can be considered as a computerized tool (e.g., a combination of computer-executable hardware and/or computer-executable software) that can be electronically integrated with a deployed machine learning model. In various cases, such a computerized tool can automatically monitor the deployed machine learning model as the deployed machine learning model operates in a commercial and/or industrial setting, rather than in a controlled model-development setting. More specifically, the computerized tool can, in various aspects, automatically monitor data candidates which are fed to the deployed machine learning model and inferences which are generated by the deployed machine learning model based on the data candidates. As explained herein, the computerized tool can analyze the inferences to determine whether they are correct. In various cases, when the computerized tool determines that an inference produced by the deployed machine learning model is incorrect, the computerized tool can capture the data candidate which caused such incorrect inference, can generate synthetic training data based on the data candidate, and can train and/or update the deployed machine learning model based on the synthetic training data. In other words, the computerized tool as described herein can, in various embodiments, capture specific data candidates which the deployed machine learning model encounters in the field and which cause the deployed machine learning model to fail, and can exploit such specific data candidates to improve the performance of the deployed machine learning model.

In various embodiments, such a computerized tool can be electronically integrated, via any suitable wired and/or wireless electronic connection, with a data pipeline, and such a computerized tool can comprise a receiver component, a listener component, a comparison component, an augmentation component, and a training component.

In various embodiments, the data pipeline can be any suitable electronic communications network over which a plurality of data candidates can be electronically transmitted and/or stored. In some cases, a data candidate can be any suitable electronic data exhibiting any suitable dimensionality and/or format. That is, a data candidate can be one or more scalars, one or more vectors, one or more matrices, one or more tensors, one or more strings, and/or any suitable combination thereof. In various instances, different data candidates can exhibit the same and/or different dimensionalities and/or formats as each other.

In various aspects, the plurality of data candidates can be transmitted, received, and/or analyzed (at the same and/or different times) over the data pipeline by a plurality of deployed machine learning models. In various instances, a deployed machine learning model can exhibit any suitable machine learning architecture (e.g., neural network, support vector machine, logistic regression model, naïve Bayes model). In various cases, different deployed machine learning models can exhibit the same and/or different architectures as each other. In some instances, at least one of the plurality of deployed machine learning models can be configured to receive as input at least one of the plurality of data candidates and to produce as output at least one inference based on the at least one of the plurality of data candidates. In various aspects, the at least one of the plurality of deployed machine learning models can transmit over and/or store in the data pipeline the at least one inference.

Furthermore, in some aspects, the plurality of data candidates can be transmitted, received, and/or analyzed (at the same and/or different times) over the data pipeline by a plurality of expert computing devices. In various cases, an expert computing device can be any suitable computing device (e.g., any suitable combination of computer-executable hardware and/or computer-executable software) which can be operated by and/or otherwise associated with a subject matter expert (e.g., the expert computing device can be a laptop computer, a desktop computer, a mobile computing device). In various cases, a subject matter expert can be any suitable entity that is deemed to be an expert in the technical field in which at least one of the plurality of deployed machine learning models is deployed. In some cases, a subject matter expert can be human and/or otherwise. In various instances, at least one of the plurality of expert computing devices can receive from the data pipeline at least one of the plurality of data candidates, the subject matter expert associated with the at least one of the plurality of expert computing devices can manually analyze the at least one of the plurality of data candidates, and the at least one of the plurality of expert computing devices can transmit over and/or store in the data pipeline at least one expert conclusion provided by the subject matter expert based on the at least one of the plurality of data candidates.

As a non-limiting example, the data pipeline can, in various embodiments, be a Health-Layer 7 (HL7) network. As those having ordinary skill in the art will appreciate, a hospital and/or any other suitable healthcare organization can implement an HL7 network. In such case, individual departments (e.g., radiology, oncology, audiology) within the hospital and/or healthcare organization can produce electronic patient data in a standardized format, and such individual departments can cause such electronic patient data to be transmitted over and/or stored within the HL7 network, so that such electronic patient data is available to other departments within the hospital and/or healthcare organization. In various instances, such electronic patient data (e.g., MRI scanned images, X-ray scanned images, CT scanned images, medical reports/documents) can be considered as the plurality of data candidates mentioned above. Furthermore, in various aspects, the HL7 network can be electronically integrated with biomedical artificial intelligence algorithms. In various cases, such biomedical artificial intelligence algorithms can be configured to receive from the HL7 network the electronic patient data, to produce inferences (e.g., diagnoses, prognoses, recommended treatments) based on such electronic patient data, and to transmit and/or store in the HL7 network such inferences. In various instances, such biomedical artificial intelligence algorithms can be considered as the plurality of deployed machine learning models mentioned above. Further still, in various aspects, the HL7 network can be electronically integrated with computing devices that are operated by medical professionals (e.g., doctors, nurses, medical technicians). In various cases, such computing devices (e.g., desktop computers, laptop computers, medical computing equipment) can be configured to receive from the HL7 network the electronic patient data, to allow the medical professionals to manually analyze the electronic patient data, and to transmit and/or store in the HL7 network conclusions made by the medical professionals based on the electronic patient data. In various instances, such computing devices can be considered as the plurality of expert computing devices mentioned above.

In various embodiments, the receiver component can electronically receive and/or otherwise electronically access electronic input information. In various cases, the receiver component can electronically retrieve the electronic input information from any suitable centralized and/or decentralized data structure (e.g., graph data structure, relational data structure, hybrid data structure), whether remote from and/or local to the receiver component. In various other cases, the receiver component can electronically receive the electronic input information from any suitable human-computer-interface device (e.g., keyboard, keypad, touchscreen, voice command).

In various embodiments, the electronic input information can identify a particular deployed machine learning model in the plurality of deployed machine learning models. In various aspects, the electronic input information can further identify one or more data criteria. In various cases, the one or more data criteria can specify any suitable data requirements which can be used to filter through and/or triage the plurality of data candidates (e.g., can specify minimum data values, can specify maximum data values, can specify acceptable data types, can specify unacceptable data types, can specify acceptable data timestamps, can specify unacceptable data timestamps, can specify acceptable data demographics, can specify unacceptable data demographics).

In various cases, such identification of the particular machine learning model and such identification of the one or more data criteria can be considered as an electronic instruction and/or command for the computerized tool described herein to monitor any of the plurality of data candidates which are analyzed by the particular deployed machine learning model and which satisfy the one or more data criteria. Accordingly, in various embodiments, the listener component can electronically monitor, scan, and/or screen the data pipeline over any suitable timespan (e.g., minutes, hours, days, weeks, months, and/or even years) in search of any data candidate that satisfies the one or more data criteria and that has been analyzed by the particular deployed machine learning model. In various aspects, once the listener component identifies in the data pipeline a particular data candidate that has been analyzed by the particular deployed machine learning model and that complies with the one or more data criteria, the listener component can electronically capture (e.g., copy, log, record, extract) the particular data candidate from the data pipeline.

Furthermore, in various embodiments, the listener component can electronically monitor the data pipeline over any suitable timespan in search of an inference generated by the particular deployed machine learning model based on the particular data candidate. In various instances, once the listener component identifies in the data pipeline a particular inference that has been generated by the particular deployed machine learning model based on the particular data candidate, the listener component can electronically capture the particular inference from the data pipeline.

Further still, in various embodiments, the listener component can electronically monitor the data pipeline over any suitable timespan in search of an expert conclusion provided by an expert computing device based on the particular data candidate. In various instances, once the listener component identifies in the data pipeline a particular expert conclusion that has been provided by an expert computing device based on the particular data candidate, the listener component can electronically capture the particular expert conclusion from the data pipeline.

Those having ordinary skill in the art will appreciate that the listener component can implement any suitable data querying technique and/or data searching technique in order to identify and/or extract the particular data candidate, the particular inference, and/or the particular expert conclusion from the data pipeline.

In various embodiments, the comparison component can electronically compare the particular inference with the particular expert conclusion. Based on such comparison, the comparison component can determine whether the particular inference is consistent with the particular expert conclusion (e.g., can determine whether the particular inference matches and/or is the same as the particular expert conclusion). In some instances, the comparison component can determine that the particular inference is consistent with the particular expert conclusion if the particular inference is within any suitable threshold margin (e.g., 1% difference, 5% difference) of the particular expert conclusion. In various cases, if the particular inference is consistent with the particular expert conclusion, the particular inference can be considered as correct. On the hand, if the particular inference is inconsistent with the particular expert conclusion, the particular inference can be considered as incorrect.

Those having ordinary skill in the art will appreciate that the format and/or dimensionality of the particular inference can correspond to (e.g., be the same as) that of the particular expert conclusion, thereby enabling comparison between the particular inference and the particular expert conclusion. For example, both the particular inference and the particular expert conclusion can be classifications of a biomedical scanned image (e.g., one classification generated by the particular deployed machine learning model, and the other classification manually generated by a subject matter expert), and the comparison component can determine whether such classifications match and/or are the same. As another example, both the particular inference and the particular expert conclusion can be segmentations of a biomedical scanned image (e.g., one segmentation generated by the particular deployed machine learning model, and the other segmentation manually generated by a subject matter expert), and the comparison component can determine whether such segmentations match and/or are sufficiently similar (e.g., within any suitable threshold margin of each other). As yet another example, both the particular inference and the particular expert conclusion can be recommended amounts of medication based on patient data (e.g., one recommended amount of medication generated by the particular deployed machine learning model, and the other recommended amount of medication manually generated by a subject matter expert), and the comparison component can determine whether such recommended amounts of medication match and/or are sufficiently similar.

In various embodiments, the augmentation component can, in response to a determination by the comparison component that the particular inference is not consistent with the particular expert conclusion, electronically generate one or more synthetic data candidates based on the particular data candidate. In various cases, the particular expert conclusion can be considered as the correct determination to be drawn based on the particular data candidate. Accordingly, if the particular inference is not consistent with the particular expert conclusion, it can be determined that the particular deployed machine learning model incorrectly analyzed the particular data candidate. In various aspects, if the particular deployed machine learning model incorrectly analyzed the particular data candidate (e.g., if the particular data candidate constitutes failure data), the augmentation component can electronically create one or more synthetic data candidates by using the particular data candidate as a seed. More specifically, in various instances, if the comparison component determines that the particular data candidate is not consistent with the particular expert conclusion, the augmentation component can electronically create one or more anonymized copies of the particular data candidate via any suitable anonymization techniques. That is, the augmentation component can electronically copy the particular data candidate one or more times, and the augmentation component can electronically delete, erase, obscure, and/or crop out any personal identification information that is present within and/or appended to the one or more copies of the particular data candidate. In various aspects, the augmentation component can then augment the one or more copies of the particular data candidate in any suitable fashion. For example, if the particular data candidate comprises one or more images, then the augmentation component can apply different rotations, different magnifications, different Gaussian blurrings, different object insertions, and/or different optical distortions to different copies of the particular data candidate. As another example, if the particular data candidate comprises non-image numerical data, the augmentation component can apply random perturbations (e.g., randomized multiplicative scaling, randomized additive scaling) to different copies of the particular data candidate. After such one or more copies of the particular data candidate have been augmented, they can be considered as the one or more synthetic data candidates. Furthermore, in various embodiments, the augmentation component can annotate the one or more synthetic data candidates with the particular expert conclusion. In other words, the particular expert conclusion can be considered as the correct ground truth label for each of the one or more synthetic data candidates.

In various embodiments, the training component can electronically train (e.g., via supervised training) the particular deployed machine learning model based on the one or more synthetic data candidates. More specifically, the training component can electronically feed to the particular deployed machine learning model the one or more synthetic data candidates, thereby causing the particular deployed machine learning model to output results. In various cases, the training component can compute errors and/or losses based on differences between the particular expert conclusion and such outputted results (e.g., the particular expert conclusion can be considered as the annotation associated with the one or more synthetic data candidates). In various instances, the training component can electronically update (e.g., via backpropagation) parameters (e.g., weights and/or biases) of the particular deployed machine learning model based on such computed errors and/or losses. In this way, the training component can iteratively improve the performance of the particular deployed machine learning model based on the one or more synthetic data candidates. Those having ordinary skill in the art will appreciate that, in some cases, unsupervised training and/or reinforcement learning can be implemented, rather than supervised training.

In summary, the computerized tool described herein can be electronically coupled to a data pipeline. In various cases, the data pipeline can include various electronic data that is often being accessed, edited, analyzed, and/or transmitted by a plurality of deployed machine learning models and/or by a plurality of expert computing devices. In various aspects, the computerized tool can receive electronic instructions to monitor the performance of an identified deployed machine learning model that is coupled to the data pipeline. In various instances, the computerized tool can spend any suitable amount of time searching through the data pipeline for a data candidate that has been analyzed by the identified deployed machine learning model. In various aspects, once the computerized tool finds such a data candidate in the data pipeline, the computerized tool can record from the data pipeline such data candidate and can record from the data pipeline the inference outputted by the identified deployed machine learning model based on such data candidate. In various instances, the computerized tool can also spend any suitable amount of time searching through the data pipeline for an expert conclusion that has been provided by a subject matter expert associated with one of the expert computing devices based on such data candidate. In various cases, once the computerized tool finds such an expert conclusion in the data pipeline, the computerized tool can record from the data pipeline such expert conclusion.

At this point, the computerized tool can be considered as having captured a data candidate encountered by the identified machine learning model during deployment in the field, an inference for the data candidate generated by the identified deployed machine learning model, and an expert conclusion for the data candidate manually created by a subject matter expert. Accordingly, the computerized tool can compare the inference with the expert conclusion to determine whether or not they are consistent with each other. If the inference is not consistent with the expert conclusion, the computerized tool can create synthetic data candidates by augmenting anonymized copies of the data candidate. In various cases, the computerized tool can then train the identified deployed machine learning model based on the synthetic data candidates. In this way, particular failure data which the identified deployed machine learning model encounters in the field can be captured and leveraged to improve the performance of the identified deployed machine learning model.

To help clarify some of the above discussion, consider the following non-limiting example. Suppose that a hospital utilizes an HL7 network across which CT scanned images of patients, MRI scanned images of patients, and X-ray scanned images of patients are transmitted and/or stored. Furthermore, suppose that the hospital utilizes a first machine learning model that is configured to detect large vessel occlusions in CT scanned images of patients' brains, a second machine learning model that is configured to detect lung nodules in MRI scanned images of patients' chests, and a third machine learning model that is configured to classify fractures in X-ray scanned images of patient's spines. In various cases, the computerized tool described herein can be operatively coupled to the HL7 network.

In various aspects, the receiver component can receive instructions that identify the second machine learning model. Accordingly, the listener component can monitor, for any suitable timespan, the HL7 network in search of MRI scanned images that have been analyzed by the second machine learning model. If the listener component identifies such an MRI scanned image, the listener component can record the MRI scanned image as well as the inference generated by the second machine learning model based on the MRI scanned image. Similarly, the listener component can monitor, for any suitable timespan, the HL7 network in search of an expert conclusion created by a subject matter expert that manually analyzed the MRI scanned image. If the listener component identifies such an expert conclusion, the listener component can record it. In various cases, due to the practicalities inherent in the biomedical field, such expert conclusion can be transmitted and/or stored in the HL7 network days, weeks, months, or even years after the second machine learning model analyzed the MRL scanned image. In various aspects, the comparison component can compare the inference with the expert conclusion. If the comparison component determines that the inference is not consistent with the expert conclusion (e.g., if the inference does not detect lung nodules in the MRI scanned image while the expert conclusion does, or if the inference detects lung nodules in the MRI scanned image while the expert conclusion does not), the augmentation component can create augmented and anonymized copies of the MRI scanned image. In various instances, the training component can then train the second machine learning model on the augmented and anonymized copies of the MRI scanned image, thereby improving the performance of the second machine learning model.

Various embodiments of the subject innovation can be employed to use hardware and/or software to solve problems that are highly technical in nature (e.g., to facilitate automated machine learning model feedback with data capture and synthetic data generation), that are not abstract and that cannot be performed as a set of mental acts by a human. Further, some of the processes performed can be performed by a specialized computer (e.g., trained machine learning models, data pipeline listeners) for carrying out defined tasks related to automated machine learning model feedback with data capture and synthetic data generation. For example, such defined tasks can include: receiving, by a device operatively coupled to a processor, electronic input identifying a deployed machine learning model; retrieving, by the device, from a data pipeline a data candidate that has been analyzed by the deployed machine learning model, an inference generated by the deployed machine learning model based on the data candidate, and an expert conclusion provided by a subject matter expert based on the data candidate; comparing, by the device, the inference with the expert conclusion to determine whether the inference is consistent with the expert conclusion; generating, by the device and in response to a determination that the inference is not consistent with the expert conclusion, a set of synthetic training data based on the data candidate; and training, by the device, the deployed machine learning model based on the set of synthetic training data. Such defined tasks are not conventionally performed manually by humans. Moreover, neither the human mind nor a human with pen and paper can electronically receive electronic instructions identifying a deployed machine learning model, electronically retrieve from a data pipeline a data candidate analyzed by the deployed machine learning model, electronically retrieve from the data pipeline an inference generated by the deployed machine learning model based on the data candidate, electronically retrieve from the data pipeline an expert conclusion generated by a subject matter expert based on the data candidate, electronically compare the inference with the expert conclusion, electronically generate synthetic training data if the inference does not match the expert conclusion, and electronically train the deployed machine learning model on the synthetic training data. Instead, various embodiments of the subject innovation are inherently and inextricably tied to computer technology and cannot be implemented outside of a computing environment (e.g., embodiments of the subject innovation constitute a computerized tool that can automatically capture data candidates in the wild which cause a deployed machine learning model to fail, which can automatically generate synthetic training data based on such captured data candidates, and which can automatically update the deployed machine learning model based on such synthetic training data; such a computerized tool cannot be practicably implemented in any sensible way without computers).

Moreover, various embodiments of the subject innovation can integrate into a practical application various teachings described herein relating to the field of machine learning model monitoring. As explained above, conventional techniques for monitoring deployed machine learning models are manual and do not effectively leverage specific failure data encountered in the wild by the deployed machine learning models. In contrast, various embodiments of the subject innovation include a computerized tool that can be instructed to automatically search a data pipeline for data candidates that have been analyzed by an identified deployed machine learning model. Once a suitable data candidate is found, such a computerized tool can also automatically search the data pipeline for an inference generated by the identified deployed machine learning model based on the found data candidate and an expert conclusion manually created by a subject matter expert based on the found data candidate. In various cases, the computerized tool can electronically compare the inference with the expert conclusion. If the inference is not consistent and/or matching with the expert conclusion, the computerized tool can create copies of the found data candidate, can anonymize such copies, and can augment such copies, thereby yielding a set of synthetic training data. In various aspects, the computerized tool can update (e.g., via backpropagation) the identified deployed machine learning model based on the set of synthetic training data. In other words, the computerized tool described herein can specifically detect individual data candidates which cause the identified deployed machine learning model to fail and can leverage such detected data candidates to improve the performance of the identified deployed machine learning model. In still other words, the computerized tool can be considered as computer-executable hardware and/or computer-executable software that can automatically monitor and improve a machine learning model that is deployed in the field. Such a computerized tool clearly constitutes a useful and practical application of computers.

Furthermore, various embodiments of the subject innovation can control real-world tangible devices based on the disclosed teachings. For example, various embodiments of the subject innovation can electronically update parameters of a real-world machine learning model that has been deployed into the wild.

It should be appreciated that the herein figures and description provide non-limiting examples of the subject innovation.

FIG. 1 illustrates a block diagram of an example, non-limiting system 100 that can facilitate automated machine learning model feedback with data capture and synthetic data generation in accordance with one or more embodiments described herein. As shown, a deployed machine learning model feedback system 102 can be electronically integrated, via any suitable wired and/or wireless electronic connection, with a data pipeline 104.

In various aspects, the data pipeline 104 can be any suitable electronic communications network over which electronic data can be transmitted and/or in which electronic data can be stored. In various instances, such electronic data can include a set of data candidates 106. The set of data candidates 106 can include any suitable number of data candidates. As mentioned above, a data candidate can be any suitable electronic data having any suitable dimensionality and/or format. For instance, a data candidate can be one or more scalars, one or more vectors, one or more matrices, one or more tensors, one or more strings, and/or any suitable combination thereof. In some cases, different data candidates of the set of data candidates 106 can have the same and/or different dimensionalities/formats as each other (e.g., various data candidates in the set of data candidates 106 can be scalars, various data candidates in the set of data candidates 106 can be matrices (e.g., images), various data candidates in the set of data candidates 106 can be strings (e.g., documents/reports)).

In various instances, the data pipeline 104 can include and/or otherwise be operatively coupled to a set of machine learning models 108. In various aspects, the set of machine learning models 108 can include any suitable number of machine learning models. As mentioned above, a machine learning model can exhibit any suitable type of machine learning architecture and/or artificial intelligence architecture. As some non-limiting examples, a machine learning model can be a neural network, can be a support vector machine, can be a logistic regression model, can be a naïve Bayes model, can be a random forest model, can be a decision tree model, and/or can be any suitable combination thereof. In various cases, different machine learning models in the set of machine learning models 108 can have the same and/or different architectures as each other (e.g., various machine learning models in the set of machine learning models 108 can be neural networks, various machine learning models in the set of machine learning models 108 can be support vector machines, various machine learning models in the set of machine learning models 108 can be logistic regression models). In some cases, various machine learning models in the set of machine learning models 108 can electronically receive as input various data candidates in the set of data candidates 106, can produce as output various inferences (e.g., determinations, predictions, results) based on those various data candidates, and/or can transmit and/or store in the data pipeline 104 those various inferences.

In various aspects, the data pipeline 104 can include and/or otherwise be operatively coupled to a set of expert computing devices 110. In various aspects, the set of expert computing devices 110 can include any suitable number of expert computing devices. As mentioned above, an expert computing device can be any suitable combination of computer-executable hardware and/or computer-executable software that is operated by and/or otherwise associated with a subject matter expert. For instance, an expert computing device can be a laptop computer, a desktop computer, a mobile computing device, and/or any other suitable computing device. In some cases, various expert computing devices in the set of expert computing devices 110 can electronically receive various data candidates in the set of data candidates 106, can enable associated subject matter experts to manually analyze and/or evaluate those various data candidates to yield various expert conclusions, and can transmit and/or store in the data pipeline 104 those various expert conclusions.

As a non-limiting example, the data pipeline 104 can be an HL7 network implemented by a hospital. In such case, the set of data candidates 106 can be a set of electronic patient data (e.g., MRI scanned images of patients, CT scanned images of patients, X-ray scanned images of patients, medical documents/reports of patients) that are generated by various departments within the hospital. Moreover, in such case, the set of machine learning models 108 can be a set of biomedical artificial intelligence algorithms that are leveraged by various departments within the hospital to automatically diagnose and/or treat patients. Furthermore, in such case, the set of expert computing devices 110 can be a set of computers and/or medical computing equipment that are operated by various medical professionals (e.g., doctors, nurses, medical technicians) in the hospital so as to enable such medical professionals to manually view and/or manually evaluate electronic patient data.

In various instances, the set of machine learning models 108 can be considered as being deployed. In other words, the set of machine learning models 108 can have previously been trained and/or validated (e.g., individually and/or collectively) during a model development stage, and the set of machine learning models 108 can now be considered as being deployed in any suitable commercial and/or industrial setting (e.g., such as a hospital and/or biomedical setting, as in the above example). As mentioned above, it can be the case that the performance accuracies exhibited the set of machine learning models 108 during deployment are different than the performance accuracies exhibited by the set of machine learning models 108 during training and/or validation. Accordingly, it can be desired to monitor the performance of the set of machine learning models 108 to detect and/or cure such performance disparities. As mentioned above, conventional techniques provide only for manual monitoring of the set of machine learning models 108, which can be time-consuming and un-rigorous. As explained herein, the deployed machine learning model feedback system 102 can help to ameliorate this technical problem by automatically monitoring the performance of desired ones of the set of machine learning models 108.

In various embodiments, the deployed machine learning model feedback system 102 can comprise a processor 112 (e.g., computer processing unit, microprocessor) and a computer-readable memory 114 that is operably and/or operatively and/or communicatively connected/coupled to the processor 112. The computer-readable memory 114 can store computer-executable instructions which, upon execution by the processor 112, can cause the processor 112 and/or other components of the deployed machine learning model feedback system 102 (e.g., receiver component 116, listener component 118, comparison component 120, augmentation component 122, training component 124) to perform one or more acts. In various embodiments, the computer-readable memory 114 can store computer-executable components (e.g., receiver component 116, listener component 118, comparison component 120, augmentation component 122, training component 124), and the processor 112 can execute the computer-executable components.

In various embodiments, the deployed machine learning model feedback system 102 can comprise a receiver component 116. In various aspects, the receiver component 116 can receive electronic input from any suitable computing source. For example, the receiver component 116 can retrieve the electronic input from any suitable centralized and/or decentralized data structure (not shown) that is electronically accessible to the receiver component 116, whether remote from and/or local to the receiver component 116. As another example, the receiver component 116 can receive the electronic input from any suitable human-computer interface device (not shown), such as a keyboard, keypad, and/or touchscreen that is operatively coupled to the deployed machine learning model feedback system 102. In various instances, the electronic input can identify a particular machine learning model in the set of machine learning models 108. In various cases, this identification can be considered as an electronic instruction and/or command to monitor the performance of the particular machine learning model. In various aspects, the electronic input can further identify one or more data criteria. In various cases, such one or more data criteria can include any suitable filtering information that can be used to filter through the set of data candidates 106. For example, such one or more data criteria can include one or more minimum data thresholds, one or more maximum data thresholds, one or more specified data types and/or tags, and/or one or more specified timestamps.

In various embodiments, the deployed machine learning model feedback system 102 can comprise a listener component 118. In various aspects, the listener component 118 can electronically monitor the data pipeline 104 in search of a data candidate in the set of data candidates 106 which has been analyzed by the machine learning model identified in the electronic input received by the receiver component 116. If the electronic input also includes the one or more data criteria, the listener component 118 can electronically monitor the data pipeline 104 in search of a data candidate in the set of data candidates 106 that has been analyzed by the identified machine learning model and that complies with the one or more data criteria. In various instances, the listener component 118 can implement any suitable data querying technique to scan through the data pipeline 104 in search of such a data candidate. In various aspects, once the listener component 118 identifies a data candidate that has been analyzed by the identified machine learning model and/or that satisfies the one or more data criteria, the listener component 118 can electronically extract (e.g., copy, record, log, store, retrieve) that data candidate from the data pipeline 104.

In various embodiments, because the extracted data candidate has been analyzed by the identified machine learning model, the identified machine learning model can have generated an inference based on the extracted data candidate and can have transmitted and/or stored that inference in the data pipeline 104. Accordingly, in various cases, the listener component 118 can electronically extract (e.g., copy, record, log, store, retrieve) that inference from the data pipeline 104.

In various embodiments, the listener component 118 can electronically monitor the data pipeline 104 in search of an expert conclusion provided by one of the set of expert computing devices 110 based on the identified data candidate. In other words, a subject matter expert can, at any suitable time either before or after the identified machine learning model has analyzed the extracted data candidate, utilize one of the set of expert computing devices 110 to view and/or manually evaluate the identified data candidate, thereby yielding an expert conclusion based on the identified data candidate. In various cases, the subject matter expert can then utilize the one of the set of expert computing devices 110 to transmit and/or store that expert conclusion in the data pipeline 104. Just as above, the listener component 118 can implement any suitable data querying technique to scan through the data pipeline 104 in search of such an expert conclusion. In various aspects, once the listener component 118 identifies an expert conclusion that has been provided by one of the set of expert computing devices 110 based on the identified data candidate, the listener component 118 can electronically extract (e.g., copy, record, log, store, retrieve) that expert conclusion from the data pipeline 104.

In various embodiments, the deployed machine learning model feedback system 102 can comprise a comparison component 120. In various aspects, the comparison component 120 can electronically compare the extracted inference with the extracted expert conclusion and can accordingly determine whether the extracted inference is consistent with the extracted expert conclusion. In various cases, the extracted inference can have a same dimensionality and/or format as the extracted expert conclusion, so as to permit comparison. As a non-limiting example, the identified data candidate can be an MRI scanned image of a patient, in which case the extracted inference can be an automatically-generated classification that characterizes the MRI scanned image, and in which case the extracted expert conclusion can be a manually-generated classification that characterizes the MRI scanned image. As another non-limiting example, the identified data candidate can be a medical report of a patient, in which case the extracted inference can be an automatically-generated treatment recommendation based on the medical report, and in which case the extracted expert conclusion can be a manually-generated treatment recommendation based on the medical report. In various cases, the comparison component 120 can determine that the extracted inference is consistent with the extracted expert conclusion if the extracted inference matches the extracted expert conclusion and/or if the extracted inference is within any suitable threshold margin of the extracted expert conclusion.

In various embodiments, the deployed machine learning model feedback system 102 can comprise an augmentation component 122. In various aspects, the augmentation component 122 can generate a set of synthetic data candidates based on the identified data candidate, if the comparison component 120 determines that the extracted inference is not consistent with the extracted expert conclusion. More specifically, the augmentation component 122 can make one or more electronic copies of the identified data candidate, in response to the comparison component 120 determining that the extracted inference is not consistent with the extracted expert conclusion. In various instances, the augmentation component 122 can anonymize the one or more copies via any suitable anonymization technique. For example, the augmentation component 122 can delete, erase, crop out, and/or obscure any personal identification information contained with and/or appended to the identified data candidate (e.g., the identified data candidate can be formatted according to a template having certain data fields known to contain personal identification information, and the augmentation component 122 can delete and/or hide the information contained in such data fields). In various cases, the augmentation component 122 can augment the one or more copies via any suitable augmentation techniques, so as to introduce feature variability into the one or more copies. For example, if the identified data candidate is an image, the augmentation component 122 can randomly rotate the one or more copies, randomly zoom in on the one or more copies, randomly zoom out on the one or more copies, randomly tilt the one or more copies, randomly blur the one or more copies, randomly insert images of objects into the one or more copies, and/or otherwise randomly distort the one or more copies. In various instances, after such anonymization and/or augmentation, the one or more copies can be considered as the set of synthetic data candidates.

In various embodiments, the deployed machine learning model feedback system 102 can comprise a training component 124. In various aspects, the training component 124 can electronically train (e.g., via supervised training) the identified machine learning model based on the set of synthetic data candidates. That is, the training component 124 can feed the set of synthetic data candidates to the identified machine learning model and/or can iteratively update (e.g., via backpropagation) parameters of the identified machine learning model.

In other words, the deployed machine learning model feedback system 102 can be instructed to monitor the performance of an identified machine learning model, can screen the data pipeline 104 for a data candidate that has been analyzed by the identified machine learning model, can screen the data pipeline 104 for an inference generated by the identified machine learning based on the data candidate, can screen the data pipeline 104 for an expert conclusion provided by a subject matter expert based on the data candidate, and can compare the inference with the expert conclusion. If the inference is inconsistent with the expert conclusion, the deployed machine learning model feedback system 102 can generate synthetic data candidates by augmenting copies of the data candidate. Accordingly, the deployed machine learning model feedback system 102 can update parameters of the identified machine learning model based on the synthetic data candidates, thereby improving performance of the identified machine learning model. In this way, the identified machine learning model can be automatically monitored and updated during deployment (e.g., outside of a controlled model development setting/environment) by the deployed machine learning model feedback system 102. Accordingly, the deployed machine learning model feedback system 102 certainly constitutes a useful and practical application of computer-executable hardware and/or computer-executable software.

Figure 2:
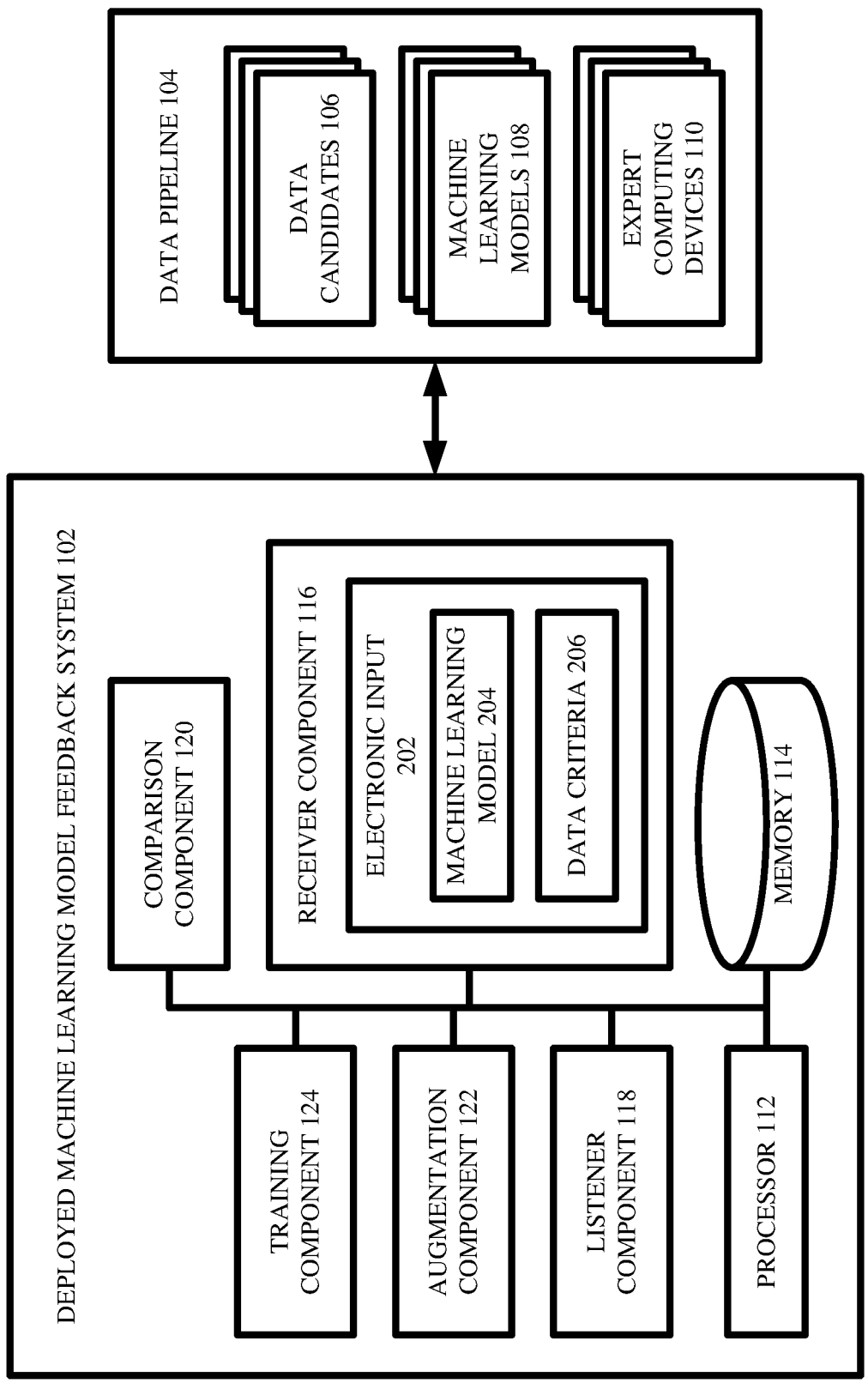
FIG. 2 illustrates a block diagram of an example, non-limiting system including electronic input that facilitates automated machine learning model feedback with data capture and synthetic data generation in accordance with one or more embodiments described herein.

FIG. 2 illustrates a block diagram of an example, non-limiting system 200 including electronic input that can facilitate automated machine learning model feedback with data capture and synthetic data generation in accordance with one or more embodiments described herein. As shown, the system 200 can, in some cases, comprise the same components as the system 100, and can further comprise electronic input 202.

In various embodiments, the receiver component 116 can receive and/or otherwise access the electronic input 202. In various cases, the receiver component 116 can retrieve the electronic input 202 from any suitable data structure (not shown) that is electronically accessible to the receiver component 116. In various other cases, the receiver component 116 can receive the electronic input 202 from any suitable human-computer-interface device (not shown), such as a keyboard, keypad, and/or touchscreen that is operatively coupled to the receiver component 116.

In various embodiments, the electronic input 202 can identify and/or otherwise indicate in any suitable fashion a machine learning model 204. In various instances, the machine learning model 204 can be one of the machine learning models in the set of machine learning models 108. That is, the machine learning model 204 can be operatively coupled to the data pipeline 104 such that the machine learning model 204 can analyze various data candidates in the set of data candidates 106. In various aspects, identification of the machine learning model 204 in the electronic input 202 can be interpreted by the receiver component 116 as an instruction and/or command to monitor the performance of the machine learning model 204.

As shown, in various embodiments, the electronic input 202 can identify and/or otherwise indicate in any suitable fashion a set of data criteria 206. In various instances, the set of data criteria 206 can include any suitable data filters that can be used to filter through and/or otherwise triage the set of data candidates 106. For example, the set of data criteria 206 can specify any suitable threshold values (e.g., minimum thresholds, maximum thresholds), can specify any suitable data types/formats (e.g., strings, integers, floating points numbers), can specify any suitable data content tags (e.g., content tags can call out content of the data candidate, such as patient demographics), and/or can specify any suitable data timestamps (e.g., a timestamp can indicate a time/date at which a data candidate was formed, stored, transmitted, accessed, and/or analyzed). In various cases, any data candidate from the set of data candidates 106 can either satisfy or fail to satisfy the set of data criteria 206. In various aspects, identification of the set of data criteria 206 in the electronic input 202 can be interpreted by the receiver component 116 as an instruction and/or command to monitor data candidates in the set of data candidates 106 that comply with the set of data criteria 206 and that have been analyzed by the machine learning model 204.

Figure 3:
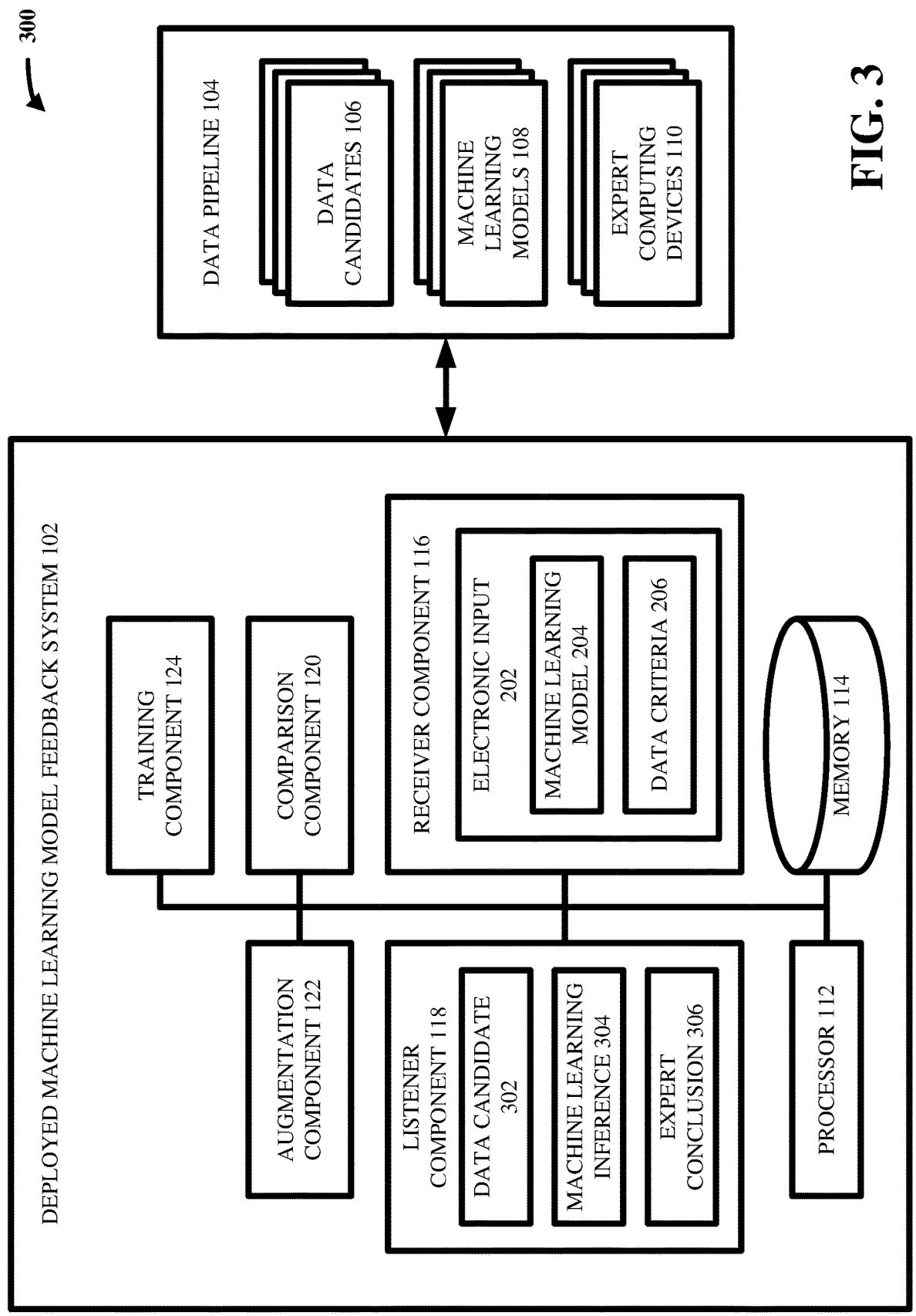
FIG. 3 illustrates a block diagram of an example, non-limiting system including a data candidate, a machine learning inference, and/or an expert conclusion that facilitates automated machine learning model feedback with data capture and synthetic data generation in accordance with one or more embodiments described herein.

FIG. 3 illustrates a block diagram of an example, non-limiting system 300 including a data candidate, a machine learning inference, and/or an expert conclusion that can facilitate automated machine learning model feedback with data capture and synthetic data generation in accordance with one or more embodiments described herein. As shown, the system 300 can, in some cases, comprise the same components as the system 200, and can further comprise a data candidate 302, a machine learning inference 304, and/or an expert conclusion 306.

In various embodiments, the listener component 118 can electronically extract from the data pipeline 104 a data candidate 302. In various cases, the data candidate 302 can be one of the data candidates in the set of data candidates 106. More specifically, in various instances, the data candidate 302 can have been analyzed (e.g., received as input by) the machine learning model 204 and can satisfy the set of data criteria 206. In other words, in response to the receiver component 116 receiving the electronic input 202 which identifies the machine learning model 204 and which identifies the set of data criteria 206, the listener component 118 can electronically search, via any suitable data querying technique, through the data pipeline 104 to find a data candidate in the set of data candidates 106 which has been evaluated by the machine learning model 204 and which complies with the data criteria 206. In some cases, the listener component 118 can be unable to find such a data candidate, since such a data candidate might not yet exist (e.g., at any given point in time, it can be the case that no data candidate which complies with the set of data criteria 206 has been analyzed by the machine learning model 204). In such case, the listener component 118 can periodically (and/or aperiodically) search through the data pipeline 104 until such a data candidate is found (e.g., after some elapsed time, it can be the case that a data candidate which complies with the set of data criteria 206 has now been analyzed by the machine learning model 204). Once such a data candidate is found, the listener component 118 can extract (e.g., copy, retrieve, record) such data candidate from the data pipeline 104.

As a non-limiting example, suppose that the data pipeline 104 is an HL7 network implemented by a hospital. Furthermore, suppose that the set of machine learning models 108 include a first biomedical artificial intelligence algorithm that is configured to classify X-ray images of patients and a second biomedical artificial intelligence algorithm that is configured to segment CT images of patients. In various cases, the electronic input 202 can identify and/or otherwise indicate the second biomedical artificial intelligence algorithm. That is, the second biomedical artificial intelligence algorithms can be considered as the machine learning model 204. In various instances, the electronic input 202 can also identify and/or otherwise indicate that only data candidates pertaining to male patients having hypertension and who are between the ages of 30 years and 45 years are to be monitored. That is, the set of data criteria 206 can include a first criteria specifying male patients, a second criterion specifying hypertension, and a third criterion specifying a patient age range of 30 years to 45 years. Accordingly, the listener component 118 can query the HL7 network for a CT scanned image that has been analyzed by the second biomedical artificial intelligence algorithm and that depicts a male patient having hypertension and who is between the ages of 30 years and 45 years. Once such a CT scan is found, the listener component 118 can extract such CT scan from the HL7 network (e.g., such CT scan can be considered as the data candidate 302). If no CT scan satisfies those conditions at the time of query by the listener component 118, the listener component 118 can re-query the data pipeline 104 at one or more future times until such a CT scan is found.

In various embodiments, the listener component 118 can electronically extract from the data pipeline 104 a machine learning inference 304. In various aspects, the machine learning inference 304 can be a determination and/or result outputted by the machine learning model 204 based on the data candidate 302. In various cases, as mentioned above, the data candidate 302 can have been analyzed by the machine learning model 204. That is, the machine learning model 204 can have received as input the data candidate 302 from the data pipeline 104, can have produced as output the machine learning inference 304 based on the data candidate 302, and/or can have transmitted and/or stored the machine learning inference 304 in the data pipeline 104. In various cases, the listener component 118 can search, via any suitable data querying technique, the data pipeline 104 for the machine learning inference 304. Once located, the listener component 118 can extract (e.g., copy, retrieve, record) the machine learning inference 304 from the data pipeline 104.

In various embodiments, the listener component 118 can electronically extract from the data pipeline 104 an expert conclusion 306. In various aspects, the expert conclusion 306 can be a determination and/or result manually provided by a subject matter expert based on the data candidate 302. More specifically, in various cases, one of the set of expert computing devices 110 can receive from the data pipeline 104 the data candidate 302. In various instances, a subject matter expert that operates and/or is otherwise associated with that expert computing device can utilize the expert computing device to manually view, manually evaluate, and/or manually analyze the data candidate 302. In various cases, the subject matter expert can utilize that expert computing device to create the expert conclusion 306, which can be any suitable electronic data that indicates and/or otherwise conveys a determination and/or inference manually made by the subject matter expert based on the data candidate 302. In various instances, that expert computing device can transmit and/or store in the data pipeline 104 the expert conclusion 306. In various cases, the listener component 118 can search, via any suitable data querying technique, the data pipeline 104 for the expert conclusion 306. Once located, the listener component 118 can extract (e.g., copy, retrieve, record) the expert conclusion 306 from the data pipeline 104. If the expert conclusion 306 does not yet exist in the data pipeline 104 (e.g., if no subject matter expert has yet manually analyzed the data candidate 302 at the time of search by the listener component 118), the listener component 118 can re-query the data pipeline 104 at one or more future times until the expert conclusion 306 is found.

Figure 4:
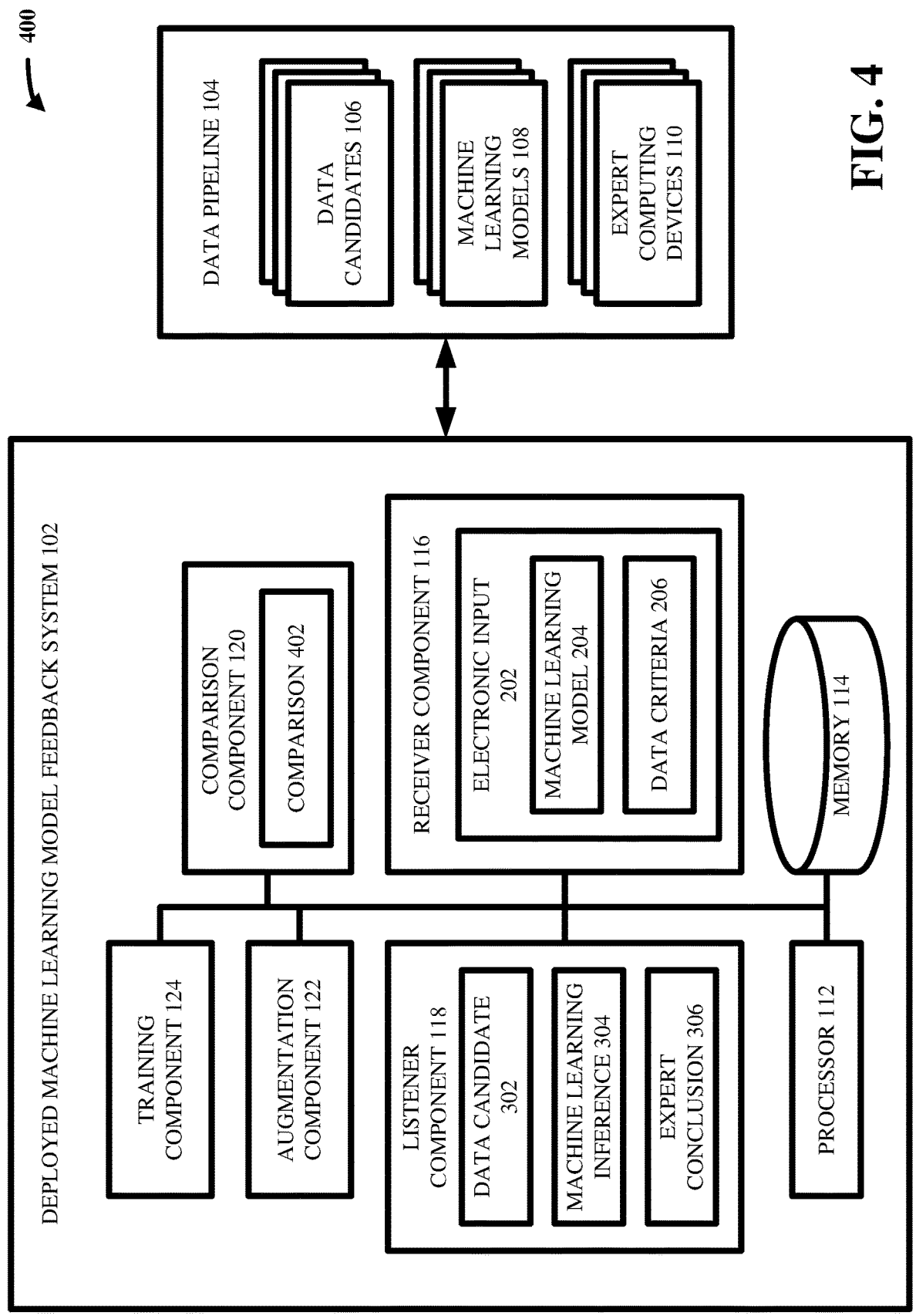
FIG. 4 illustrates a block diagram of an example, non-limiting system including a comparison that facilitates automated machine learning model feedback with data capture and synthetic data generation in accordance with one or more embodiments described herein.

FIG. 4 illustrates a block diagram of an example, non-limiting system 400 including a comparison that can facilitate automated machine learning model feedback with data capture and synthetic data generation in accordance with one or more embodiments described herein. As shown, the system 400 can, in some cases, comprise the same components as the system 300, and can further comprise a comparison 402.

In various embodiments, the comparison component 120 can electronically compare the machine learning inference 304 with the expert conclusion 306, thereby yielding the comparison 402. Based on the comparison 402, the comparison component 120 can determine whether the machine learning inference 304 is consistent with (e.g., matches and/or is the same as) the expert conclusion 306. Those having ordinary skill in the art will appreciate that the machine learning inference 304 can have a same dimensionality and/or format as the expert conclusion 306, such that the machine learning inference 304 can be compared to the expert conclusion 306. For example, the data candidate 302 can be an image, and the machine learning inference 304 and the expert conclusion 306 can both be classifications based on that image. As another example, the data candidate 302 can be a medical document, and the machine learning inference 304 and the expert conclusion 306 can both be recommended treatments based on that medical document.

In various aspects, the comparison component 120 can utilize any suitable numerical comparison techniques, image comparison techniques, and/or string comparison techniques in order to compare the machine learning inference 304 with the expert conclusion 306. For example, if the machine learning inference 304 and the expert conclusion 306 involve scalars, the comparison component 120 can compute percent differences between such scalars, and such percent differences can collectively be considered as the comparison 402. As another example, if the machine learning inference 304 and the expert conclusion 306 involve vectors, matrices, and/or tensors, the comparison component 120 can compute Euclidean distances and/or cosine similarities between such vectors, matrices, and/or tensors, and such Euclidean distances and/or cosine similarities can collectively be considered as the comparison 402. As yet another example, if the machine learning inference 304 and the expert conclusion 306 involve strings, the comparison component 120 can perform character-wise comparisons of such strings, and such character-wise comparisons can collectively be considered as the comparison 402. As still another example, if the machine learning inference 304 and the expert conclusion 306 involve strings, the comparison component 120 can utilize any suitable word embedding techniques to convert such strings into numerical representations and can then compute Euclidean distances and/or cosine similarities between such numerical representations, where such Euclidean distances and/or cosine similarities can collectively be considered as the comparison 402.

In any case, the comparison component 120 can determine whether the machine learning inference 304 is consistent with the expert conclusion 306 based on the comparison 402. In some cases, the machine learning inference 304 and the expert conclusion 306 can be considered as consistent if the comparison 402 shows that the machine learning inference 304 is the same as the expert conclusion 306. In other cases, the machine learning inference 304 and the expert conclusion 306 can be considered as consistent if the comparison 402 shows that the machine learning inference 304 is within any suitable threshold margin of error of the expert conclusion 306 (e.g., within 5% difference). In such cases, the machine learning inference 304 and the expert conclusion 306 can be considered as inconsistent if the comparison 402 shows that the machine learning inference 304 is not within that threshold margin of error of the expert conclusion 306 (e.g., more than 5% difference).

In various aspects, the expert conclusion 306 can be considered as the ground truth associated with the data candidate 302. Accordingly, if the machine learning inference 304 is consistent with the expert conclusion 306, the machine learning inference 304 can be considered as correct. On the other hand, if the machine learning inference 304 is inconsistent with the expert conclusion 306, the machine learning inference 304 can be considered as incorrect.

Figure 5:
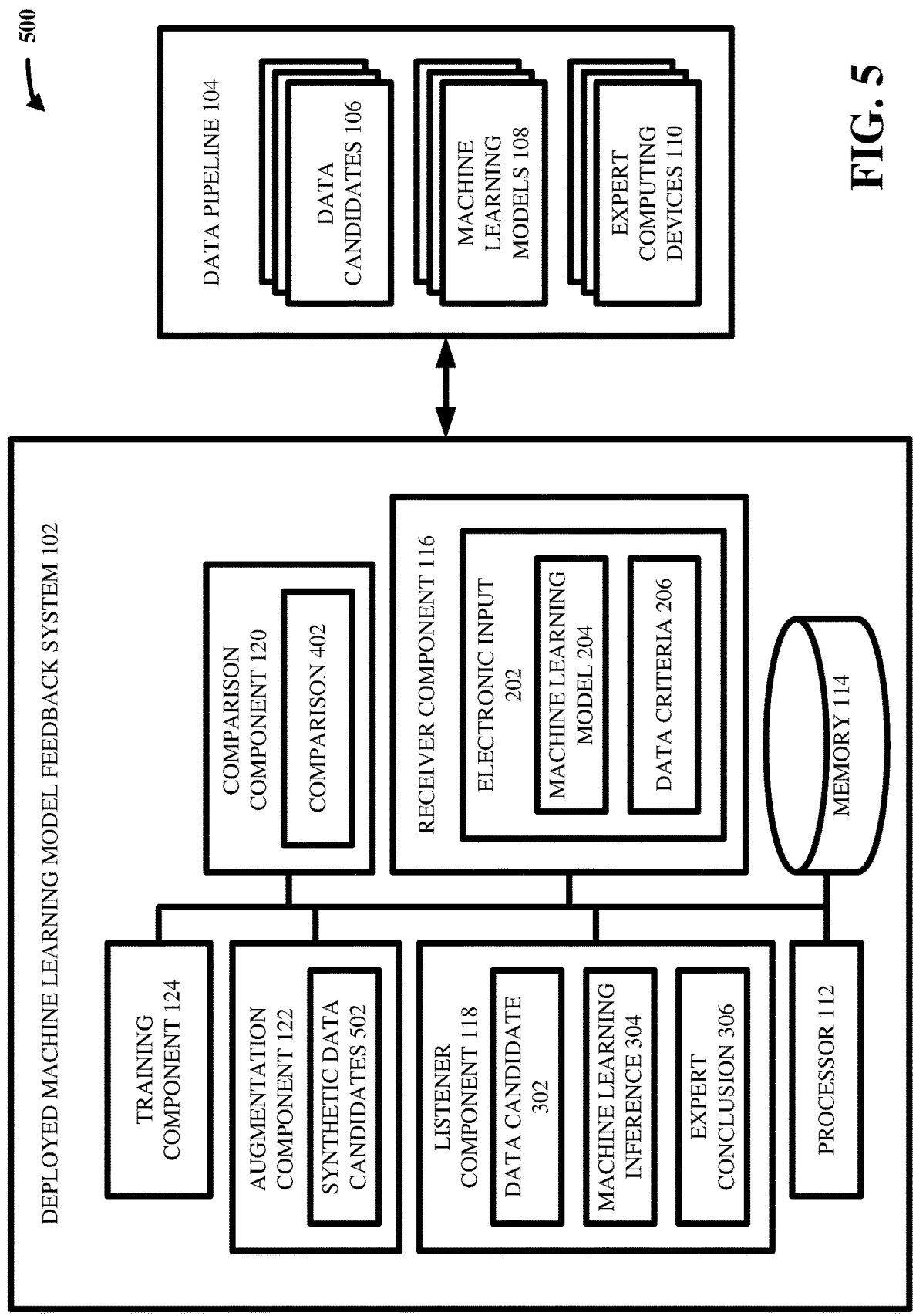
FIG. 5 illustrates a block diagram of an example, non-limiting system including synthetic data candidates that facilitates automated machine learning model feedback with data capture and synthetic data generation in accordance with one or more embodiments described herein.

FIG. 5 illustrates a block diagram of an example, non-limiting system 500 including synthetic data candidates that can facilitate automated machine learning model feedback with data capture and synthetic data generation in accordance with one or more embodiments described herein. As shown, the system 500 can, in some cases, comprise the same components as the system 400, and can further comprise synthetic data candidates 502.

In various embodiments, the augmentation component 122 can generate a set of synthetic data candidates 502 based on the data candidate 302, if the comparison component 120 determines that the machine learning inference 304 is not consistent with the expert conclusion 306. More specifically, if the comparison component 120 determines that the machine learning inference 304 is inconsistent with the expert conclusion 306, the augmentation component 122 can electronically copy the data candidate 302 one or more times.

In various instances, the augmentation component 122 can anonymize and/or de-identify the one or more copies of the data candidate 302, via any suitable anonymization techniques. For example, if the data candidate 302 is electronic patient data associated with a particular patient (e.g., a medical document/report), the augmentation component 122 can delete and/or erase any metadata that is appended to and/or contained within the data candidate 302 and that indicates and/or conveys personal identification information of the particular patient (e.g., can delete/erase patient name, patient home address, patient telephone number, patient social security number). As another example, if the data candidate 302 is an image that depicts a patient's face and/or eyes, the augmentation component 122 can obscure, blur, and/or crop out the portion of the image that depicts the patient's face and/or eyes. In various cases, the augmentation component 122 can implement any suitable pattern recognition and/or image recognition technical to localize (and then obscure and/or remove) the patient's face and/or eyes.

In various instances, the augmentation component 122 can apply any suitable augmentations to the one or more anonymized copies of the data candidate 302. For example, if the data candidate 302 is an image, the augmentation component 122 can modify the one or more anonymized copies of the data candidate 302 by randomly rotating various copies, randomly altering the zoom-level and/or magnification level of various copies, randomly applying a Gaussian blur to various copies, randomly inserting images of various objects and/or artefacts into various copies, and/or randomly applying various optical distortions to various copies. In various instances, the one or more augmented and anonymized copies of the data candidate 302 can be considered as the set of synthetic data candidates 502.

In various cases, the augmentation component 122 can annotate each (and/or in some cases, fewer than each) of the set of synthetic data candidates 502 with the expert conclusion 306. As mentioned above, the expert conclusion 306 can be considered as the ground truth label associated with the data candidate 302 (e.g., since the expert conclusion 306 is created by a subject matter expert). Accordingly, the augmentation component 122 can label each of the set of synthetic data candidates 502 with the expert conclusion 306.

In various embodiments, the training component 124 can electronically train the machine learning model 204 based on the set of synthetic data candidates 502. More specifically, the training component 124 can update, such as via backpropagation, parameters of the machine learning model 204 (e.g., weights and/or biases of the machine learning model 204) based on the synthetic data candidates 502.

As explained above, the machine learning inference 304 can be inconsistent with the expert conclusion 306. That is, the comparison component 120 can determine that the machine learning model 204 incorrectly analyzed the data candidate 302. Accordingly, the augmentation component 122 can generate the set of synthetic data candidates 502 by using the data candidate 302 as a seed. Specifically, the augmentation component 122 can copy the data candidate 302 any suitable number of times and can randomly modify the copies. As those having ordinary skill in the art will appreciate, such random modification can introduce variability into the copies of the data candidate 302, thereby yielding the set of synthetic data candidates 502. In various cases, the training component 124 can then train the machine learning model 204 on the set of synthetic data candidates 502, where the expert conclusion 306 can be taken as the ground truth label for the set of synthetic data candidates 502. As those having ordinary skill in the art will understand, such training can cause the machine learning model 204 to learn how to correctly analyze the data candidate 302, and can further cause the machine learning model 204 to become agnostic to the variability introduced by the augmentation component 122. Thus, such training can concretely improve the performance of the machine learning model 204.

Figure 6:
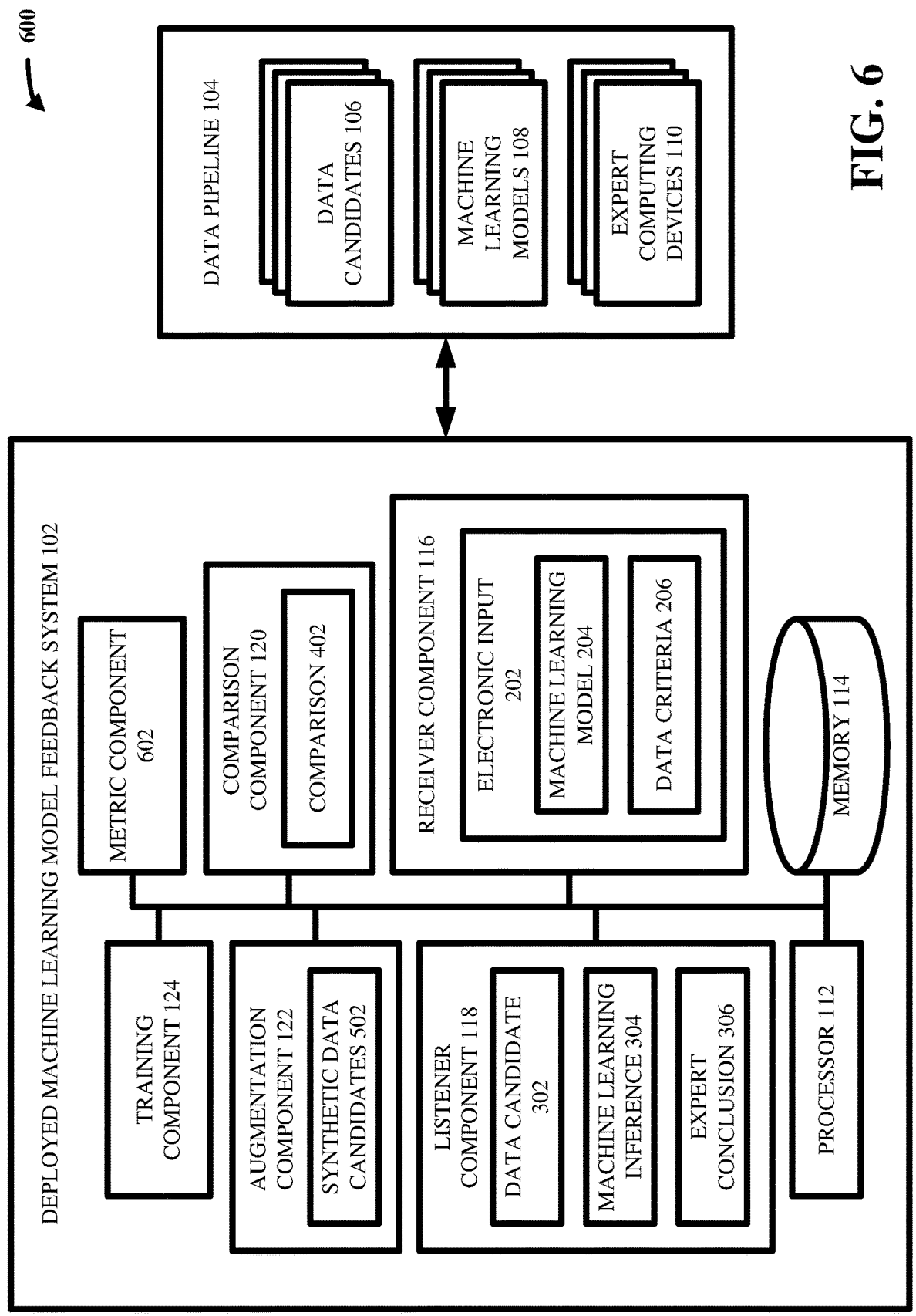
FIG. 6 illustrates a block diagram of an example, non-limiting system including a metric component that facilitates automated machine learning model feedback with data capture and synthetic data generation in accordance with one or more embodiments described herein.

FIG. 6 illustrates a block diagram of an example, non-limiting system 600 including a metric component that can facilitate automated machine learning model feedback with data capture and synthetic data generation in accordance with one or more embodiments described herein. As shown, the system 600 can, in some cases, comprise the same components as the system 500, and can further comprise a metric component 602.

In various embodiments, the deployed machine learning model feedback system 102 can comprise a metric component 602. In various aspects, the metric component 602 can electronically compute and/or update, in any suitable fashion and/or via any suitable technique, performance metrics associated with the machine learning model 204. In various cases, the metric component 602 can compute and/or update such performance metrics based on the comparison 402. For example, if the comparison 402 indicates that the machine learning inference 304 is consistent with the expert conclusion 306 (e.g., if the machine learning inference 304 is correct), the metric component 602 can increase an accuracy statistic that is associated with the machine learning model 204. In contrast, if the comparison 402 indicates that the machine learning inference 304 is inconsistent with the expert conclusion 306 (e.g., if the machine learning inference 304 is incorrect), the metric component 602 can decrease an accuracy statistic associated with the machine learning model 204. As another example, if the comparison 402 indicates that the machine learning inference 304 is consistent with the expert conclusion 306 (e.g., if the machine learning inference 304 is correct), the metric component 602 can increase a level of specificity and/or sensitivity associated with the machine learning model 204. In contrast, if the comparison 402 indicates that the machine learning inference 304 is inconsistent with the expert conclusion 306 (e.g., if the machine learning inference 304 is incorrect), the metric component 602 can decrease a level of specificity and/or sensitivity associated with the machine learning model 204. In this way, the metric component 602 can continuously maintain and/or update one or more performance metrics (e.g., statistics) that indicate how well the machine learning model 204 is performing during deployment. In some instances, the metric component 602 can transmit such performance metrics to any suitable computing device (not shown). In some cases, the metric component 602 can render such performance metrics on any suitable computer screen/display (not shown).

In various instances, the deployed machine learning model feedback system 102 can take action based on the performance metrics generated by the metric component 602. For example, in some cases, the deployed machine learning model feedback system 102 can cease monitoring the performance of the machine learning model 204 when the performance metrics generated by the metric component 602 exceed any suitable threshold. As another example, in some cases, the deployed machine learning model feedback system 102 can generate and/or transmit a warning message to any suitable computing device (not shown) when the performance metrics generated by the metric component 602 fall below any suitable threshold.

Figure 7:
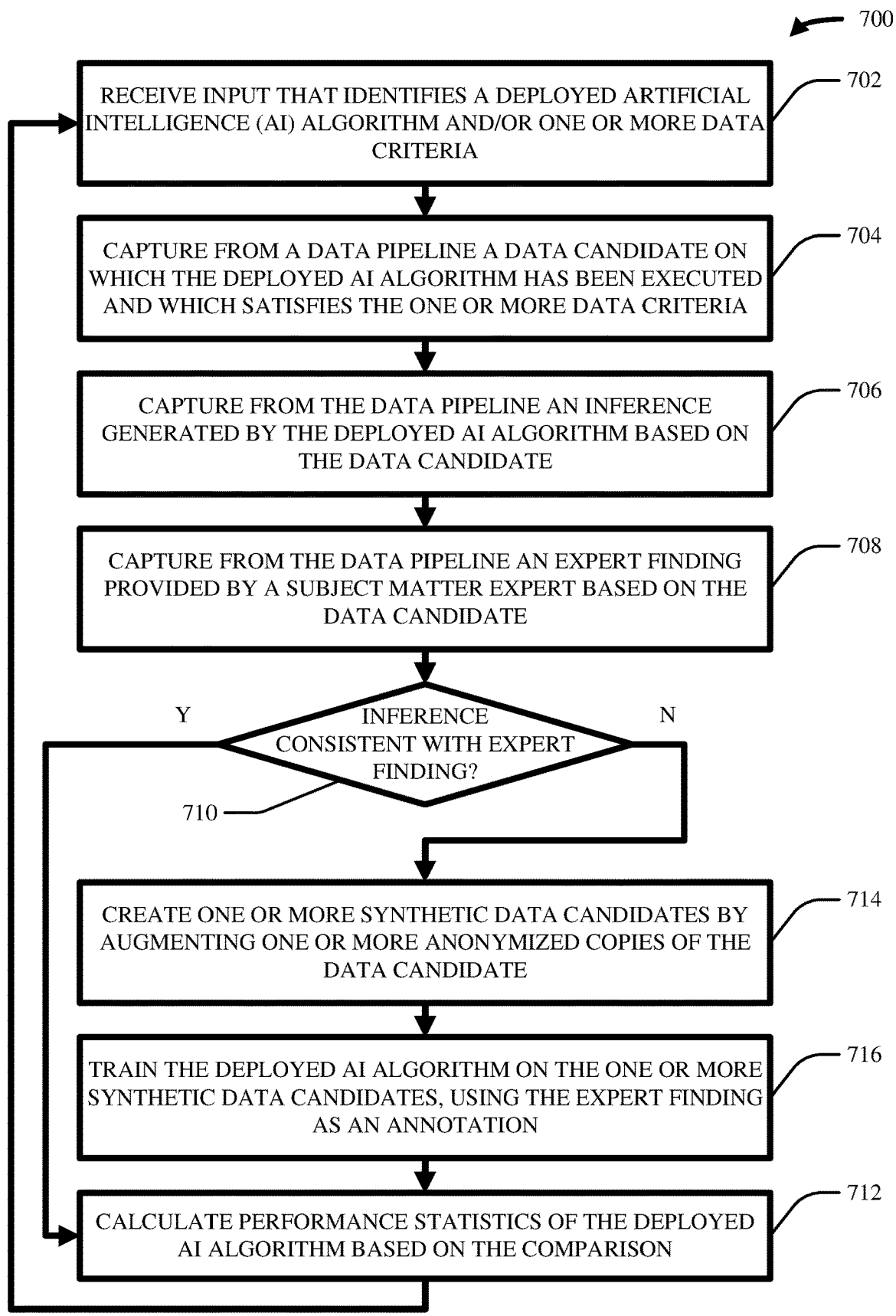
FIG. 7 illustrates a flow diagram of an example, non-limiting computer-implemented method that facilitates automated machine learning model feedback with data capture and synthetic data generation in accordance with one or more embodiments described herein.

FIG. 7 illustrates a flow diagram of an example, non-limiting computer-implemented method 700 that can facilitate automated machine learning model feedback with data capture and synthetic data generation in accordance with one or more embodiments described herein. In various cases, the computer-implemented method 700 can be facilitated by the deployed machine learning model feedback system 102.

In various embodiments, act 702 can include receiving, by a device (e.g., 116) operatively coupled to a processor, input (e.g., 202) that identifies a deployed artificial intelligence (AI) algorithm (e.g., 204) and/or one or more data criteria (e.g., 206).

In various instances, act 704 can include capturing, by the device (e.g., 118) from a data pipeline (e.g., 104) a data candidate (e.g., 302) on which the deployed AI algorithm has been executed and which satisfies the one or more data criteria.

In various aspects, act 706 can include capturing, by the device (e.g., 118), from the data pipeline an inference (e.g., 304) generated by the deployed AI algorithm based on the data candidate.

In various cases, act 708 can include capturing, by the device (e.g., 118), from the data pipeline an expert finding (e.g., 306) provided by a subject matter expert based on the data candidate.

In various instances, act 710 can include determining, by the device (e.g., 120), whether the inference is consistent with the expert finding. If it is determined that the inference is consistent with the expert finding, the computer-implemented method 700 can proceed to act 712. Instead, if it is determined that the inference is not consistent with the expert finding, the computer-implemented method 700 can proceed to act 714.

In various aspects, act 712 can include calculating, by the device (e.g., 602), performance statistics of the deployed AI algorithm based on the comparison. In various cases, the computer-implemented method 700 can proceed back to act 702.

In various embodiments, act 714 can include creating, by the device (e.g., 122), one or more synthetic data candidates (e.g., 502) by augmenting one or more anonymized copies of the data candidate.

In various instances, act 716 can include training, by the device (e.g., 124), the deployed AI algorithm on the one or more synthetic data candidates, using the expert finding as an annotation. In various cases, the computer-implemented method 700 can proceed to act 712.

Figure 8:
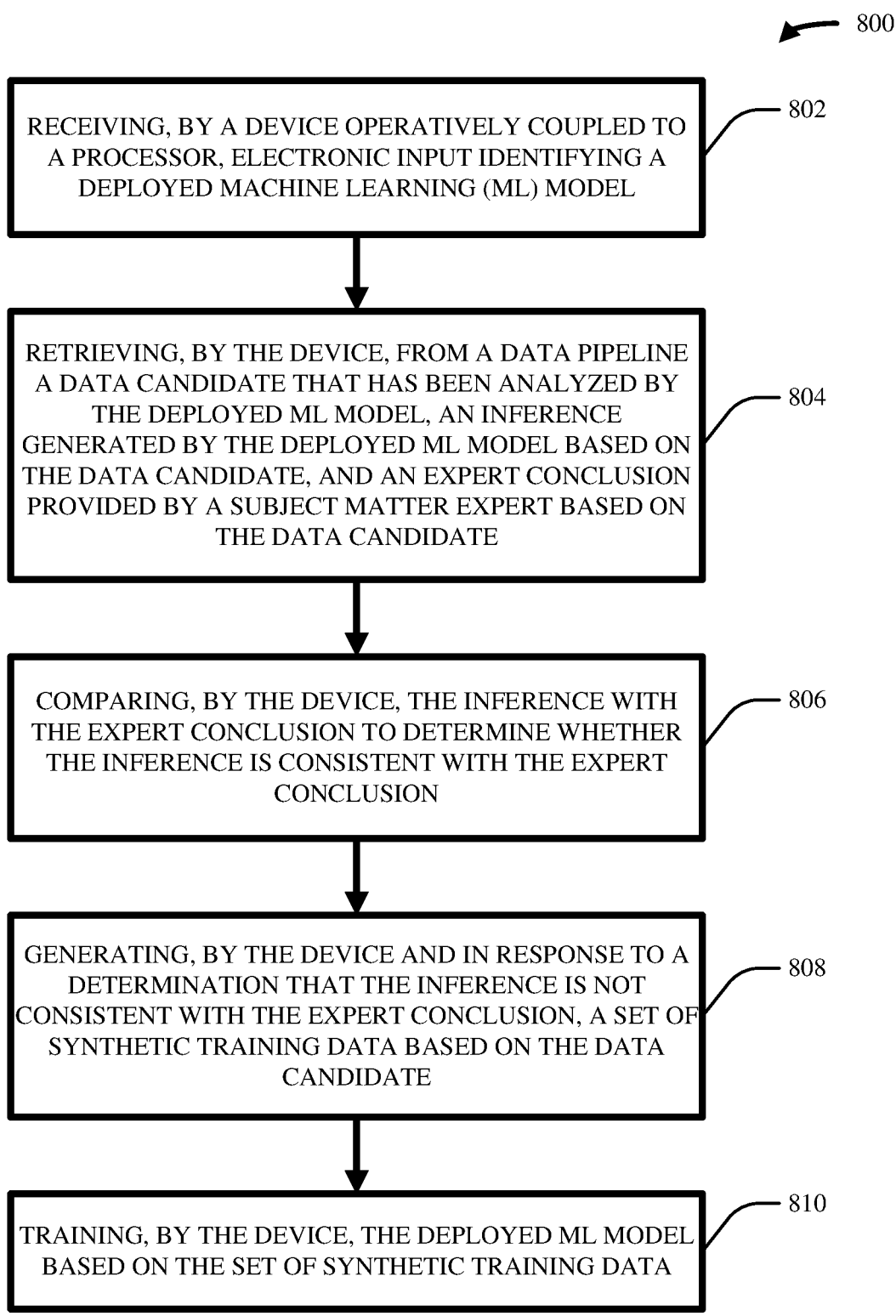
FIG. 8 illustrates a flow diagram of an example, non-limiting computer-implemented method that facilitates automated machine learning model feedback with data capture and synthetic data generation in accordance with one or more embodiments described herein.

FIG. 8 illustrates a flow diagram of an example, non-limiting computer-implemented method 800 that can facilitate automated machine learning model feedback with data capture and synthetic data generation in accordance with one or more embodiments described herein. In various cases, the computer-implemented method 800 can be facilitated by the deployed machine learning model feedback system 102.

In various embodiments, act 802 can include receiving, by a device (e.g., 116) operatively coupled to a processor, electronic input (e.g., 202) identifying a deployed machine learning (ML) model (e.g., 204).

In various aspects, act 804 can include retrieving, by the device (e.g., 118), from a data pipeline (e.g., 104) a data candidate (e.g., 302) that has been analyzed by the deployed ML model, an inference (e.g., 304) generated by the deployed ML model based on the data candidate, and an expert conclusion (e.g., 306) provided by a subject matter expert based on the data candidate.

In various instances, act 806 can include comparing, by the device (e.g., 120), the inference with the expert conclusion to determine whether the inference is consistent with the expert conclusion.

In various cases, act 808 can include generating, by the device (e.g., 122) and in response to a determination that the inference is not consistent with the expert conclusion, a set of synthetic training data (e.g., 502) based on the data candidate.

In various aspects, act 810 can include training, by the device (e.g., 124), the deployed ML model based on the set of synthetic training data.

Although not explicitly shown in FIG. 8, the computer-implemented method 800 can further comprise: computing, by the device (e.g., 602), one or more performance metrics associated with the deployed ML model based on the comparing the inference with the expert conclusion.

Although not explicitly shown in FIG. 8, the electronic input can further identify one or more criteria (e.g., 206), and the data candidate can be retrieved from the data pipeline based on the one or more criteria.

Although not explicitly shown in FIG. 8, the computer-implemented method 800 can further comprise: anonymizing, by the device (e.g., 122), the data candidate prior to the generating the set of synthetic training data.

Although not explicitly shown in FIG. 8, the generating the set of synthetic training data can comprise augmenting one or more copies of the data candidate.

Although not explicitly shown in FIG. 8, the data candidate can be one or more medical images, the inference can be a medical diagnosis and/or prognosis generated by the deployed ML model based on the one or more medical images, and the expert conclusion can be a medical diagnosis and/or prognosis provided by a medical professional based on the one or more medical images.

Although not explicitly shown in FIG. 8, the data pipeline can be a Health-Layer 7 hospital network.

Various embodiments of the subject innovation can include a computerized tool that can be electronically integrated with a data pipeline, where a plurality of deployed machine learning models receive input data from and transmit/store output data to the data pipeline, and where a plurality of expert computing devices receive input data from and transmit/store output data to the data pipeline (e.g., an HL7 hospital network can be an example of such a data pipeline). In various aspects, the computerized tool can be configured to automatically monitor the performance of a particular deployed machine learning model in the data pipeline. In various cases, the computerized tool can periodically scan the data pipeline for a data candidate which has been analyzed by the particular deployed machine learning model. Once such a data candidate is found, the computerized tool can capture the data candidate from the data pipeline. Similarly, the computerized tool can capture from the data pipeline an inference produced by the particular deployed machine learning model based on the data candidate. In various aspects, the computerized tool can also periodically scan the data pipeline for an expert conclusion that has been transmitted and/or stored in the data pipeline by one of the plurality of expert computing devices. As explained herein, such an expert conclusion can be manually provided by a subject matter expert that operates and/or that is associated with one of the plurality of expert computing devices. Once such an expert conclusion is found, the computerized tool can capture the expert conclusion from the data pipeline. In various cases, the computerized tool can compare the inference with the expert conclusion to determine whether the particular deployed machine learning model correctly analyzed the data candidate (e.g., the expert conclusion can be considered as the correct result for the data candidate). In various aspects, if the inference is not consistent with the expert conclusion, the computerized tool can generate a set of synthetic training data from the data candidate, which the computerized tool can then use to train and/or update the particular deployed machine learning model. In this way, the computerized tool as described herein can automatically improve the performance exhibited by the particular deployed machine learning model, notwithstanding that the particular deployed machine learning model is no longer in a controlled model development environment.

Figure 9:
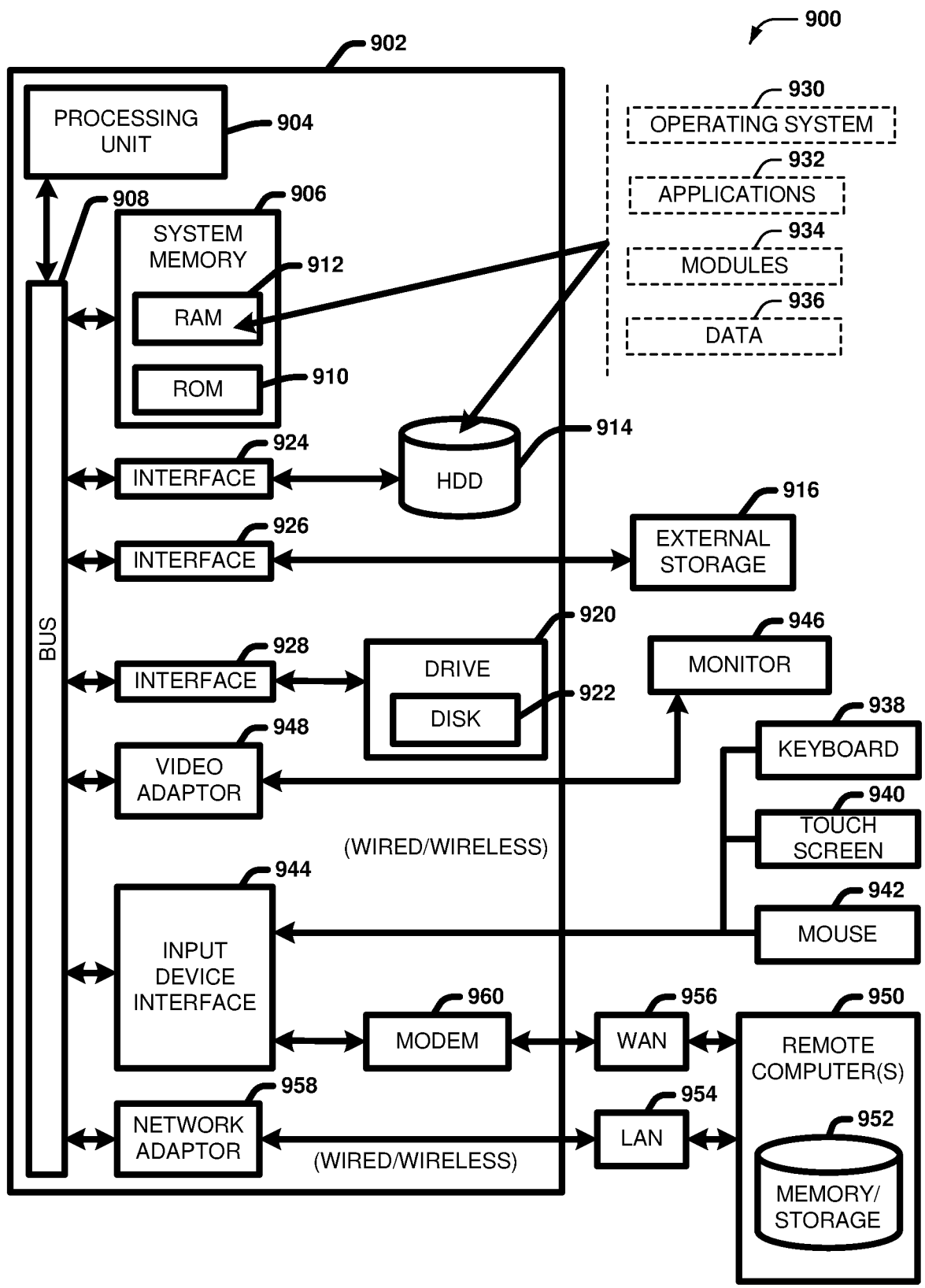
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
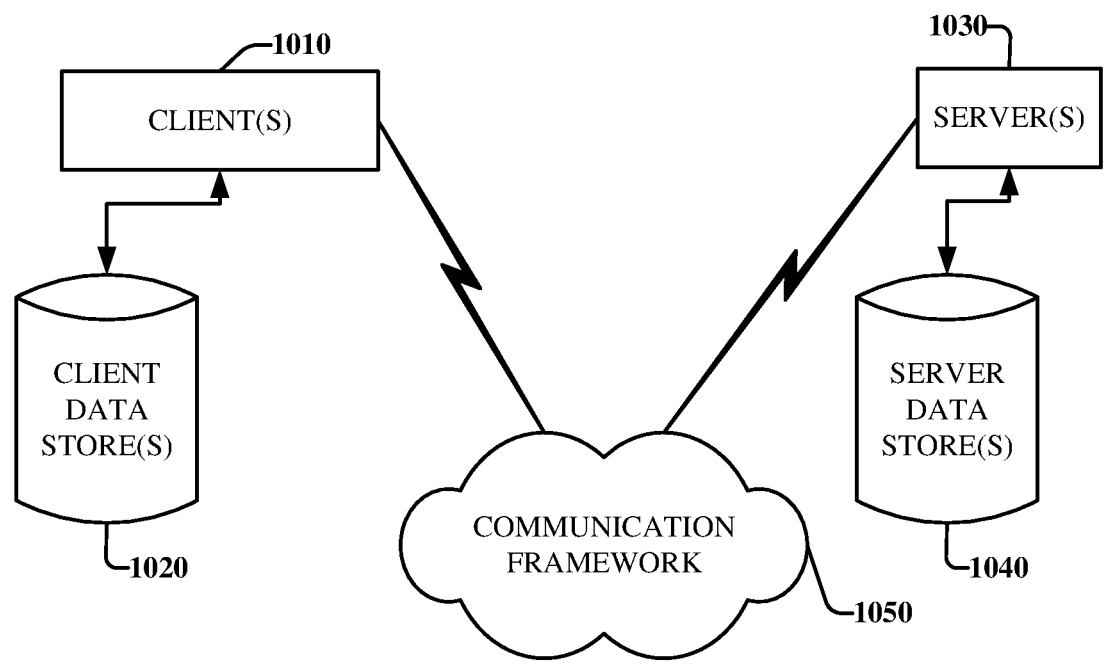
FIG. 10 illustrates an example networking environment operable to execute various implementations described herein.

FIG. 10 is a schematic block diagram of a sample computing environment 1000 with which the disclosed subject matter can interact. The sample computing environment 1000 includes one or more client(s) 1010. The client(s) 1010 can be hardware and/or software (e.g., threads, processes, computing devices). The sample computing environment 1000 also includes one or more server(s) 1030. The server(s) 1030 can also be hardware and/or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments of the subject innovation are provided in the subject matter that follows:

1. A system, comprising: a processor that executes computer-executable components stored in a computer-readable memory, the computer-executable components comprising: a receiver component that receives electronic input identifying a deployed machine learning model; a listener component that retrieves from a data pipeline a data candidate that has been analyzed by the deployed machine learning model, an inference generated by the deployed machine learning model based on the data candidate, and an expert conclusion provided by a subject matter expert based on the data candidate; a comparison component that compares the inference with the expert conclusion to determine whether the inference is consistent with the expert conclusion; and an augmentation component that, in response to a determination that the inference is not consistent with the expert conclusion, generates a set of synthetic training data based on the data candidate.

2. The system of any preceding clause, wherein the computer-executable components further comprise: a training component that trains the deployed machine learning model based on the set of synthetic training data.

3. The system of any preceding clause, wherein the computer-executable components further comprise: a metric component that computes one or more performance metrics associated with the deployed machine learning model based on the comparison between the inference and the expert conclusion.

4. The system of any preceding clause, wherein the electronic input received by the receiver component further identifies one or more criteria, and wherein the listener component retrieves the data candidate from the data pipeline based on the one or more criteria.

5. The system of any preceding clause, wherein the augmentation component anonymizes the data candidate prior to generating the set of synthetic training data.

6. The system of any preceding clause, wherein the augmentation component generates the set of synthetic training data by augmenting one or more copies of the data candidate.

7. The system of any preceding clause, wherein the data candidate is one or more medical images, wherein the inference is a medical diagnosis or prognosis generated by the deployed machine learning model based on the one or more medical images, and wherein the expert conclusion is a medical diagnosis or prognosis provided by a medical professional based on the one or more medical images.

8. The system of any preceding clause, wherein the data pipeline is a Health-Layer 7 hospital network.

9. A computer-implemented method, comprising: receiving, by a device operatively coupled to a processor, electronic input identifying a deployed machine learning model; retrieving, by the device, from a data pipeline a data candidate that has been analyzed by the deployed machine learning model, an inference generated by the deployed machine learning model based on the data candidate, and an expert conclusion provided by a subject matter expert based on the data candidate; comparing, by the device, the inference with the expert conclusion to determine whether the inference is consistent with the expert conclusion; and generating, by the device and in response to a determination that the inference is not consistent with the expert conclusion, a set of synthetic training data based on the data candidate.

10. The computer-implemented method of any preceding clause, further comprising: training, by the device, the deployed machine learning model based on the set of synthetic training data.

11. The computer-implemented method of any preceding clause, further comprising: computing, by the device, one or more performance metrics associated with the deployed machine learning model based on the comparing the inference with the expert conclusion.

12. The computer-implemented method of any preceding clause, wherein the electronic input further identifies one or more criteria, and wherein the data candidate is retrieved from the data pipeline based on the one or more criteria.

13. The computer-implemented method of any preceding clause, further comprising: anonymizing, by the device, the data candidate prior to the generating the set of synthetic training data.

14. The computer-implemented method of any preceding clause, wherein the generating the set of synthetic training data comprises augmenting one or more copies of the data candidate.

15. The computer-implemented method of any preceding clause, wherein the data candidate is one or more medical images, wherein the inference is a medical diagnosis or prognosis generated by the deployed machine learning model based on the one or more medical images, and wherein the expert conclusion is a medical diagnosis or prognosis provided by a medical professional based on the one or more medical images.

16. The computer-implemented method of any preceding clause, wherein the data pipeline is a Health-Layer 7 hospital network.

17. A computer program product for facilitating automated machine learning model feedback with data capture and synthetic data generation, the computer program product comprising a computer-readable memory having program instructions embodied therewith, the program instructions executable by a processor to cause the processor to: receive, by the processor, electronic input identifying a deployed machine learning model; retrieve, by the processor, from a data pipeline a data candidate that has been analyzed by the deployed machine learning model, an inference generated by the deployed machine learning model based on the data candidate, and an expert conclusion provided by a subject matter expert based on the data candidate; compare, by the processor, the inference with the expert conclusion to determine whether the inference is consistent with the expert conclusion; and generate, by the processor and in response to a determination that the inference is not consistent with the expert conclusion, a set of synthetic training data based on the data candidate.

18. The computer program product of any preceding clause, wherein the program instructions are further executable to cause the processor to: train, by the processor, the deployed machine learning model based on the set of synthetic training data.

19. The computer program product of any preceding clause, wherein the program instructions are further executable to cause the processor to: compute, by the processor, one or more performance metrics associated with the deployed machine learning model based on the comparison between the inference and the expert conclusion.

20. The computer program product of any preceding clause, wherein the electronic input further identifies one or more criteria, and wherein the processor retrieves the data candidate from the data pipeline based on the one or more criteria.

What is claimed is:

1. A system, comprising:
a memory that stores computer-executable components; and
a processor that executes at least one of the computer-executable components that:
monitors, in real-time, a data pipeline in a real-world medical environment, associated with a trained machine learning model deployed in the real-world medical environment;
identifies, from the data pipeline, patient data input to the trained machine learning model, and medical diagnostic inferences for patients associated with the patient data generated by the trained machine learning model based on the patient data, wherein the patient data comprises medical images of the patients;
identifies, from the data pipeline, medical diagnostic determinations for the patients associated with the medical images provided by medical professionals in the real-world medical environment;
compares the medical diagnostic inferences with the medical diagnostic determinations provided by the medical professionals to determine whether the medical diagnostic inferences are consistent with the medical diagnostic determinations;
in response to a determination that a medical diagnostic inference for a patient generated by the trained machine learning model based on a medical image of the patient is not consistent with a medical diagnostic determination for the patient provided by a medical professional based on the medical image, generates a set of synthetic training data comprising synthetic medical images based on the medical image, wherein generating the synthetic medical images comprises:
anonymizing the medical image by removing at least one of the patient's face or the patient's eyes from the medical image resulting in an anonymized medical image, and
based on the medical diagnostic determination for the patient provided by the medical professional based on the medical image, and one or more inaccurate determinations in the medical diagnostic inference generated by the trained machine learning model based on the medical image, generating the synthetic medical images by applying respective different modifications to the anonymized medical image selected from a group comprising at least two of a Gaussian blur, a rotation, a magnification, an object insertion, or an optical distortion; and
retrains the trained machine learning model to generate the medical diagnostic inferences for the patients based on the set of synthetic training data.

2. The system of claim 1, wherein the at least one of the computer-executable components further:
computes one or more performance metrics associated with the trained machine learning model based on the comparison between the medical diagnostic inferences and the medical diagnostic determinations provided by the medical professionals.

3. The system of claim 1, wherein the at least one of the computer-executable components further:
receives electronic input identifying one or more criteria; and wherein the monitoring retrieves the medical diagnostic determinations from the data pipeline based on the one or more criteria.

4. The system of claim 1, wherein the at least one of the computer-executable components further:
anonymizes the patient data prior to generating the set of synthetic training data.

5. The system of claim 1, wherein the at least one of the computer-executable components further:
generates the set of synthetic training data by augmenting one or more copies of the patient data.

6. The system of claim 1, wherein the patient data further comprises textual patient records for the patients.

7. The system of claim 6, wherein the at least one of the computer-executable components further:
anonymizes the patient data prior to the generating the set of synthetic training data.

8. The system of claim 1, wherein the data pipeline is a Health-Layer 7 hospital network.

9. A computer-implemented method, comprising:
monitoring, by a system comprising a processor, in real-time, a data pipeline in a real-world medical environment, associated with a trained machine learning model deployed in the real-world medical environment;
identifying, by the system, from the data pipeline, patient data input to the trained machine learning model, and medical diagnostic inferences for patients associated with the patient data generated by the trained machine learning model based on the patient data, wherein the patient data comprises medical images of the patients;
identifying, by the system, from the data pipeline, medical diagnostic determinations for the patients associated with the medical images provided by medical professionals in the real-world medical environment;
comparing, by the system, the medical diagnostic inferences with the medical diagnostic determinations provided by the medical professionals to determine whether the medical diagnostic inferences are consistent with the medical diagnostic determinations;
generating, by the system and in response to a determination that a medical diagnostic inference for a patient generated by the trained machine learning model based on a medical image of the patient is not consistent with a medical diagnostic determination for the patient provided by a medical professional based on the medical image, a set of synthetic training data comprising synthetic medical images based on the medical image, wherein generating the synthetic medical images comprises:
anonymizing the medical image by obscuring at least one of the patient's face or the patient's eyes in the medical image resulting in an anonymized medical image, and
based on the medical diagnostic determination for the patient provided by the medical professional based on the medical image, and one or more inaccurate determinations in the medical diagnostic inference generated by the trained machine learning model based on the medical image, generating the synthetic medical images by applying respective different modifications to the anonymized medical image selected from a group comprising at least two of a Gaussian blur, a rotation, a magnification, an object insertion, or an optical distortion; and
retraining, by the system, the trained machine learning model to generate the medical diagnostic inferences for the patients based on the set of synthetic training data.

10. The computer-implemented method of claim 9, further comprising:
computing, by the system, one or more performance metrics associated with the trained machine learning model based on the comparison between the medical diagnostic inferences and the medical diagnostic determinations provided by the medical professionals.

11. The computer-implemented method of claim 9, further comprising:
receiving, by the system, electronic input identifying one or more criteria; and
wherein the monitoring retrieves the medical diagnostic determinations from the data pipeline based on the one or more criteria.

12. The computer-implemented method of claim 9, wherein the generating the set of synthetic training data comprises augmenting one or more copies of the patient data.

13. The computer-implemented method of claim 9, wherein the patient data further comprises textual patient records for the patients.

14. The computer-implemented method of claim 9, wherein the data pipeline is a Health-Layer 7 hospital network.

15. A computer program product for facilitating automated machine learning model feedback with data capture and synthetic data generation, the computer program product comprising a non-transitory computer-readable medium having program instructions embodied therewith, the program instructions executable by a processor to cause the processor to:
monitor, in real-time, a data pipeline in a real-world medical environment, associated with a trained machine learning model deployed in the real-world medical environment;
identify, from the data pipeline, patient data input to the trained machine learning model, and medical diagnostic inferences for patients associated with the patient data generated by the trained machine learning model based on the patient data, wherein the patient data comprises medical images of the patients;
identify, from the data pipeline, medical diagnostic determinations for the patients associated with the medical images provided by medical professionals in the real-world medical environment;
compare the medical diagnostic inferences with the medical diagnostic determinations provided by the medical professionals to determine whether the medical diagnostic inferences are consistent with the medical diagnostic determinations;
generate, in response to a determination that a medical diagnostic inference for a patient generated by the trained machine learning model based on a medical image of the patient is not consistent with a medical diagnostic determination for the patient provided by a medical professional based on the medical image, a set of synthetic training data comprising synthetic medical images based on the medical image, wherein generating the synthetic medical images comprises:
anonymizing the medical image by removing at least one of the patient's face or the patient's eyes from the medical image resulting in an anonymized medical image, and
based on the medical diagnostic determination for the patient provided by the medical professional based on the medical image, and one or more inaccurate determinations in the medical diagnostic inference generated by the trained machine learning model based on the medical image, generating the synthetic medical images by applying respective different modifications to the anonymized medical image selected from a group comprising at least two of a Gaussian blur, a rotation, a magnification, an object insertion, or an optical distortion; and retrain the trained machine learning model to generate the medical diagnostic inferences for the patients based on the set of synthetic training data.

16. The computer program product of claim 15, wherein the program instructions are further executable to cause the processor to:

compute one or more performance metrics associated with the trained machine learning model based on the comparison between the medical diagnostic inferences and the medical diagnostic determinations provided by the medical professionals.

17. The computer program product of claim 15, wherein the program instructions are further executable to cause the processor to:

receive electronic input identifying one or more criteria; and wherein the monitoring retrieves the medical diagnostic determinations from the data pipeline based on the one or more criteria.

18. The computer program product of claim 15, wherein the generating the set of synthetic training data comprises augmenting one or more copies of the patient data.

19. The computer program product of claim 15, wherein the patient data further comprises textual patient records for the patients.

20. The computer program product of claim 19, wherein the program instructions are further executable to cause the processor to:

anonymize the patient data prior to the generating the set of synthetic training data.

21. The computer program product of claim 15, wherein the data pipeline is a Health-Layer 7 hospital network.

* * * * *